United States Patent
Carver et al.

(10) Patent No.: US 12,094,119 B1
(45) Date of Patent: Sep. 17, 2024

(54) PHYSICAL CHARACTERISTICS DETERMINATION SYSTEM AND METHOD(S)

(71) Applicant: ONWATER LLC, Louisville, CO (US)

(72) Inventors: Scott Vaughan Carver, Louisville, CO (US); Timothy Neal Harrington, Boulder, CO (US)

(73) Assignee: OnWater LLC, Louisville, CO (US)

( * ) Notice: Subject to any disclaimer, the term of this patent is extended or adjusted under 35 U.S.C. 154(b) by 0 days.

(21) Appl. No.: 18/638,501

(22) Filed: Apr. 17, 2024

(51) Int. Cl.
G06T 7/00 (2017.01)
G06T 7/11 (2017.01)
G06T 7/12 (2017.01)

(52) U.S. Cl.
CPC ............ G06T 7/0014 (2013.01); G06T 7/11 (2017.01); G06T 7/12 (2017.01)

(58) Field of Classification Search
CPC ............ G06T 7/0014; G06T 7/12; G06T 7/11
See application file for complete search history.

(56) References Cited

U.S. PATENT DOCUMENTS

| | | | |
|---|---|---|---|
| 9,298,978 B1 | 3/2016 | Hlatky et al. | |
| 9,367,930 B2 * | 6/2016 | Chamberlain | ......... A01K 73/10 |
| 11,170,209 B1 | 11/2021 | Ma et al. | |
| 11,659,820 B2 * | 5/2023 | Li | .......... A01K 61/13 119/231 |
| 11,786,145 B2 * | 10/2023 | Geissler | ............ A61B 5/1072 600/587 |
| 2003/0056419 A1 | 3/2003 | Squires et al. | |
| 2008/0137104 A1 | 6/2008 | Lillerud et al. | |
| 2020/0252576 A1 | 8/2020 | Isaac-Lowry | |
| 2023/0360422 A1 * | 11/2023 | Young | ................... A01K 61/95 |

FOREIGN PATENT DOCUMENTS

| | | | | |
|---|---|---|---|---|
| CN | 108267122 A | | 7/2018 | |
| CN | 111678441 A | | 9/2020 | |
| CN | 115482419 A | | 12/2022 | |
| CN | 117918023 A | * | 4/2024 | .......... A01K 29/005 |

OTHER PUBLICATIONS

Chakraverti et al., "De-noising the image using DBST-LCM-CLAHE: A deep learning approach," Multimedia Tools and Applications, 83:11017-11042, published online: Jun. 26, 2023, https://doi.org/10.1007/s11042-023-16016-2.

Cheng et al., "Underwater Fish Body Length Estimation Based on Binocular Image Processing," MDPI, Published Oct. 12, 2020, http://dx.doi.org/10.3390/info11100476, 17 pages.

(Continued)

*Primary Examiner* — Khai M Nguyen
(74) *Attorney, Agent, or Firm* — Stephen B. Katsaros; Patent Engineering, LLC

(57) ABSTRACT

The present disclosure relates to system and method(s) for determining the physical characteristics of fish using image processing and machine learning. Images of fish are captured and preprocessed. Further, characteristics determination machine learning model is trained to identify anatomical segments and calculate physical attributes thereof. These attributes are then used to determine the physical characteristics of the fish.

20 Claims, 22 Drawing Sheets

(56) References Cited

OTHER PUBLICATIONS

Crnokic et al., "Comparision of Edge Detection Methods for Obstacles Detection in a Mobile Robot Environment," Proceedings of the 27th DAAAM International Symposium, pp. 0235-0244, Published by DAAAM International, Vienna, Austria.

Deka et al., "Automated Freshwater Fish Species Classification using Deep CNN," Published online: Apr. 21, 2023 https://doi.org/10.1007/s40031-023-00883-2, J. Inst. Eng. India Ser. B, 104(3):603-621.

Fishelson, et al., "Comparative Morphology of the Eye (With Particular Attention to the Retina) in Various Species of Cardinal Fish," The Anatomical Record Part A, (Apr. 2004) 277A:249-261, Tel Aviv, Israel.

Garcia-D'Urso, et al., "The DeepFish computer vision dataset for fish instance segmentation, classification, and size estimation," Scientific Data, 9:287, Published online: Jun. 9, 2022, https://doi.org/10.1038/s41597-022-01416-0, 7 pages.

Kandimalla, et al., "Automated Detection, Classification and Counting of Fish in Fish Passages With Deep Learning," Frontiers in Marine Science, 8:823173, Published Jan. 13, 2022, 15 pages.

Lonnstedt, et al., "Predator-induced changes in the growth of eyes and false eyespots," Scientific Reports 3: 2259, Published Jul. 25, 2013, 6 pages.

Monkman, et al., "Using machine vision to estimate fish length from images using regional convolutional neural networks," Methods in Ecology and Evolution 2019;10:2045-2056, Published Aug. 10, 2019, https://doi.org/10.1111/2041-210X.13282.

Petrellis, Nikos, "Measurement of Fish Morphological Features through Image Processing and Deep Learning Techniques," Appl. Sci. 2021, 11, 4416, Published May 13, 2021 https://doi.org/10.3390/app11104416, 23 pages.

Richardson, et al., "Using relative eye size to estimate the length of fish from a single camera image," Marine Ecology Progress Series vol. 538: 213-219, 2015, Published Oct. 28, 2015.

\* cited by examiner

PHYSICAL CHARACTERISTICS DETERMINATION SYSTEM AND METHOD(S)

TECHNICAL FIELD

This disclosure pertains generally, but not by way of limitation, to systems and methods for generating characteristics. More particularly, this disclosure relates to systems and methods for determining the physical characteristics of a fish.

BACKGROUND

Measurement of sizes of fish by anglers plays a pivotal role in documenting and enhancing the recreational fly-fishing experience. Traditional methods, such as manual measurement using rulers or calipers for fish and self-reported data by anglers, often introduce inaccuracies due to the dynamic nature of live fish, varying angler perspectives, and factors that may threaten the fish's life.

SUMMARY

Fish characteristic determination method and systems are disclosed. The fish characteristic determination method may be performed to determine various characteristics of a fish from a set of images obtained thereof, such as length, height, and volume. The methods and systems to determine the characteristics are explained in detail in successive configurations of this disclosure.

In an illustrative configuration, a characteristics-determination method for determining the physical characteristics of at least one fish is disclosed. In the first step, an image-processing system may be provided. The image-processing system may include at least one image-capturing device. In the next step, a set of images of at least one fish from a first site may be captured with at least one image-capturing device. In the next step, a set of images may be pre-processed, in which a set of contrast-enhanced images from the set of images may be generated; the set of contrast-enhanced images may be de-noised to obtain a de-noised set of images, edges associated with at least one fish in the de-noised set of images may be detected for creating an edge image relevant to at least one fish. The edge image may be segmented into at least one anatomical segment. Further, in the next step, a characteristic determination machine-learning model may be trained to generate a trained characteristic determination machine-learning model. In the next step, a target anatomical segment from at least one anatomical segment may be determined with the trained characteristic determination machine-learning model. In the next step, the target anatomical segment with the trained characteristic determination machine-learning model may be analyzed by calculating at least one physical attribute of the target anatomical segment of at least one fish. In the next step, at least one physical characteristic of at least one fish with at least one physical attribute associated therewith may be determined with the trained characteristic determination machine-learning model.

In an illustrative configuration, a characteristics-determination system to determine the physical characteristics of at least one fish is disclosed. The characteristics-determination system may include an image-processing system. The image processing system may include at least one image-capturing device to capture a set of images of at least one fish from a first site, the characteristics-determination system may include a processor communicably coupled to at least one image-capturing device, and a memory communicably coupled to the processor, wherein the memory stores a set of processor-executable instructions which when executed by the processor causes the processor to generate a set of contrast-enhanced images from the set of images, de-noise the set of contrast-enhanced images for obtaining a de-noised set of images; detect edges associated with at least one fish in the de-noised set of images for creating an edge image relevant to at least one fish, and segment the edge image into at least one anatomical segment of at least one fish. The processor may be configured to train a characteristic determination machine-learning model to generate a trained characteristic determination machine-learning model. Further, with the trained characteristic determination machine-learning model, the processor may be configured to determine a target anatomical segment from at least one anatomical segment. Further, the processor may be configured to analyze the target anatomical segment with the trained characteristic determination machine-learning model to calculate at least one physical attribute of the target anatomical segment of at least one fish. Further, with the trained characteristic determination machine-learning model, the processor may be configured to determine at least one physical characteristic of at least one fish with at least one physical attribute associated therewith.

In an illustrative configuration, a species-identification method for determining the physical characteristics of at least one fish is disclosed. In the first step, an image-processing system may be provided. The image-processing system may include at least one image-capturing device. In the next step, a set of images of at least one fish from a first site may be captured with at least one image-capturing device. In the next step, a set of images may be pre-processed, in which a set of contrast-enhanced images from the set of images may be generated; the set of contrast-enhanced images may be de-noised to obtain a de-noised set of images, edges associated with at least one fish in the de-noised set of images may be detected for creating an edge image relevant to at least one fish. The edge image may be segmented into at least one anatomical segment. Further, in the next step, a characteristic determination machine-learning model may be trained to generate a trained characteristic determination machine-learning model. In the next step, a target anatomical segment from at least one anatomical segment may be determined with the trained characteristic determination machine-learning model. In the next step, the target anatomical segment with the trained characteristic determination machine-learning model may be analyzed by calculating at least one physical attribute of the target anatomical segment of at least one fish. In the next step, at least one physical characteristic of at least one fish with at least one physical attribute associated therewith may be determined with the trained characteristic determination machine-learning model. In the next step, species of at least one fish may be identified with at least one physical characteristic and at least one physical attribute of at least one fish.

In an illustrative configuration, a characteristics-determination system to determine the physical characteristics of at least one fish is disclosed. The characteristics-determination system may include an image-processing system. The image processing system may include at least one image-capturing device to capture a set of images of at least one fish from a first site, the characteristics-determination system may include a processor communicably coupled to at least one image-capturing device, and a memory communicably coupled to the processor, wherein the memory stores a set of processor-executable instructions which when executed by the processor causes the processor to generate a set of contrast-enhanced images from the set of images, de-noise the set of contrast-enhanced images for obtaining a de-noised set of images, detect edges associated with at least one fish in the de-noised set of images for creating an edge image relevant to at least one fish, and segment the edge image into at least one anatomical segment of at least one fish. The processor may be configured to train a characteristic determination machine-learning model to generate a trained characteristic determination machine-learning model. Further, the processor may be configured to determine, with the trained characteristic determination machine-learning model, a target anatomical segment from at least one anatomical segment. Further, the processor may be configured to analyze the target anatomical segment with the trained characteristic determination machine-learning model to calculate at least one physical attribute of the target anatomical segment of at least one fish. Further, with the trained characteristic determination machine-learning model, the processor may be configured to determine at least one physical characteristic of at least one fish with at least one physical attribute associated therewith. Further, the processor may be configured to identify species of at least one fish with at least one physical characteristic and at least one physical attribute of at least one fish.

In an illustrative configuration, a characteristics-determination method for determining the physical characteristics of at least one fish is disclosed. In the first step, an image-processing system may be provided. The image-processing system may include at least one image-capturing device. In the next step, a set of images of at least one fish from a first site may be captured with at least one image-capturing device. The first site may be devoid of network communication. In the next step, the set of images may be stored in the memory. In the next step, when the image-processing system reaches a connected environment, a set of images may be pre-processed, in which a set of contrast-enhanced images from the set of images may be generated, the set of contrast-enhanced images may be de-noised to obtain a de-noised set of images. The edges associated with at least one fish in the de-noised set of images may be detected to create an edge image relevant to at least one fish, and the edge image may be segmented into at least one anatomical segment. Further, in the next step, a characteristic determination machine-learning model may be trained to generate a trained characteristic determination machine-learning model. In the next step, a target anatomical segment from at least one anatomical segment may be determined with the trained characteristic determination machine-learning model. In the next step, the target anatomical segment with the trained characteristic determination machine-learning model may be analyzed by calculating at least one physical attribute of the target anatomical segment of at least one fish. In the next step, at least one physical characteristic of at least one fish with at least one physical attribute associated therewith may be determined with the trained characteristic determination machine-learning model.

In an illustrative configuration, a characteristics-determination system to determine the physical characteristics of at least one fish is disclosed. The characteristics-determination system may include an image-processing system. The image processing system may include at least one image-capturing device to capture a set of images of at least one fish from a first site, which may be devoid of network communication. The characteristics-determination system may include a processor communicably coupled to at least one image-capturing device and a memory communicably coupled to the processor, wherein the memory stores a set of processor-executable instructions which, when executed by the processor, causes the processor to store the set of images in the memory, and obtain the set of images when the characteristics-determination system reaches a connected environment. Further, the processor may be configured to generate a set of contrast-enhanced images from the set of images, de-noise the set of contrast-enhanced images for obtaining a de-noised set of images, detect edges associated with at least one fish in the de-noised set of images for creating an edge image relevant to at least one fish, and segment the edge image into at least one anatomical segment of at least one fish. The processor may be configured to train a characteristic determination machine-learning model to generate a trained characteristic determination machine-learning model. Further, the processor may be configured to determine, with the trained characteristic determination machine-learning model, a target anatomical segment from at least one anatomical segment. Further, the processor may be configured to analyze the target anatomical segment with the trained characteristic determination machine-learning model to calculate at least one physical attribute of the target anatomical segment of at least one fish. Further, with the trained characteristic determination machine-learning model, the processor may be configured to determine at least one physical characteristic of at least one fish with at least one physical attribute associated therewith.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than necessary for a fundamental understanding of the system and the various ways it is practiced. The following figures of the drawing include.

Figure 1:
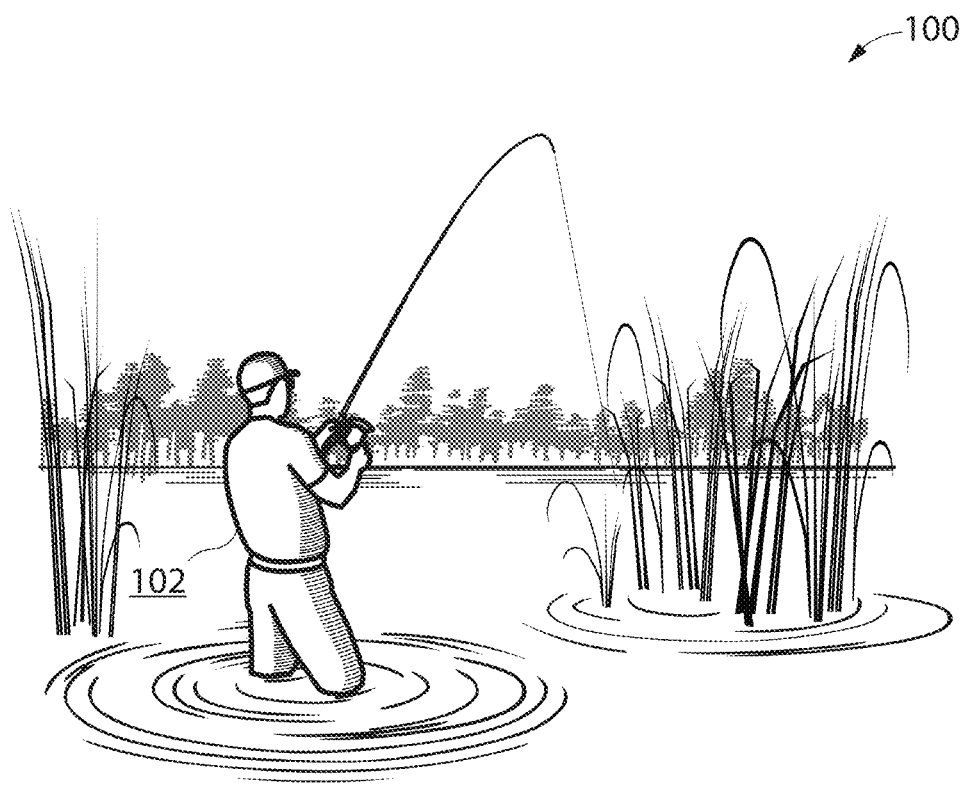
FIG. 1 illustrates a schematic view of an angler performing a fishing activity.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

Historically, fly fishing is associated with freshwater trout fishing in rivers and streams, with anglers temporarily capturing fish and releasing them after capture. However, the popularity of fly fishing has expanded to include a wide range of fish species and environments, including saltwater flats, lakes, and even urban ponds. Anglers, or individuals engaged in angling, typically use manual measurement techniques to assess the size of a captured fish outside of its aquatic environment. However, these measurements are susceptible to inaccuracies due to the instability of the fish when removed from the water. Furthermore, prolonged exposure to an unnatural environment outside their habitat may have detrimental effects, making it undesirable to keep the fish out of water for an extended period. Consequently, there exists a critical necessity for a system designed to determine physical characteristics, which may include length and species classification, without needing the removal of the fish from the water for a prolonged time. Such a system would reduce the stress on captured fish, minimize handling time, and provide accurate data for scientific, conservation, and recreational purposes.

To this end, a characteristics-determination method and system are disclosed. The characteristics-determination method may be deployed as a software tool in user devices, referring to electronic devices employed by end-users, which are integrated into a unified network architecture. The user devices may include, but are not limited to, smartphones, tablets, computers, or any other electronic equipment capable of communication and interaction. The characteristics-determination method may be configured to perform image processing on a set of images having at least one fish. The characteristics-determination method and system may be configured to perform rigorous image-processing techniques on the set of images to analyze one or more physical attributes of the fish. The physical attributes may include at least one dimension of an anatomical part of the fish, for example, the diameter of an eye socket. Based on the physical attributes, various characteristics, such as length, height, and type of species may be determined.

Figure 2:
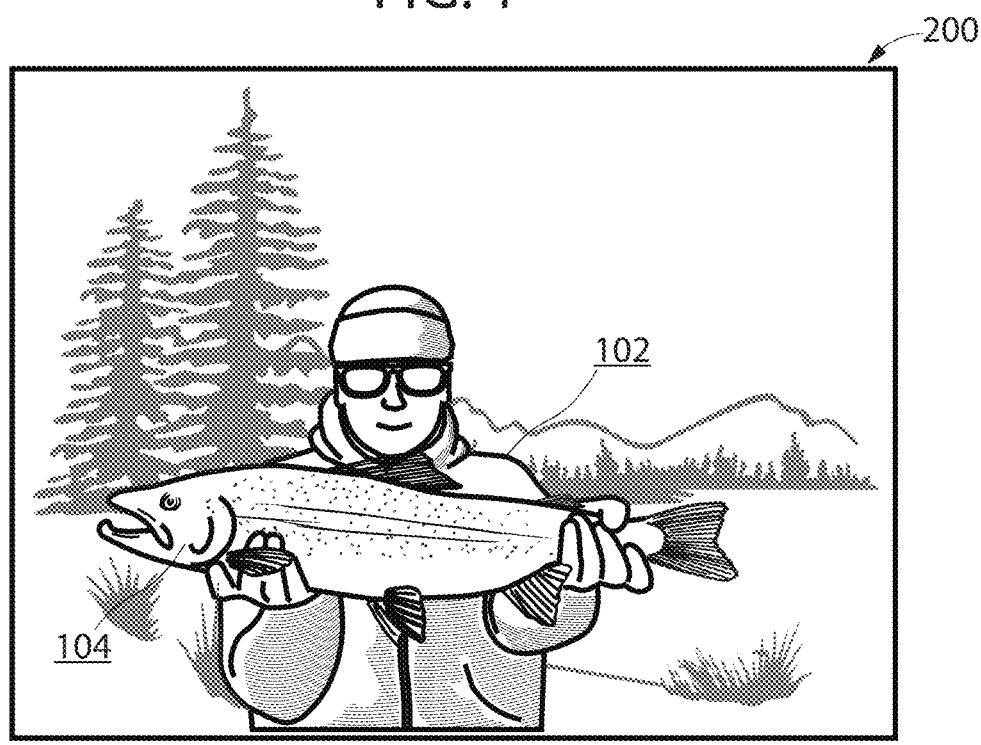
FIG. 2 illustrates an image of an angler with a temporarily captured fish.

Now, FIG. 1 illustrates a schematic view 100 of an angler 102 performing a fly-fishing activity, and FIG. 2 illustrates an image 200 of an angler 102 temporarily holding a fish during the fly-fishing activity. The image 200 may be captured within a predefined time period, and the fish may be released shortly thereafter to ensure minimal impact on its health or life.

In an illustrative configuration, and as explained earlier, the physical characteristic determination system and method may be configured to process a set of images, including the image 200 of FIG. 2. Accordingly, based on the processing, the physical characteristics of at least one fish surrounding the angler may be determined. It must be noted that the implementation of the physical characteristic determination method and system may not be limited to fly-fishing, but may also be implemented in marine fishing, or other types of fishing activities globally known. The processing of the image may be implemented by an image-processing device, which is illustrated in detail hereinafter.

Figure 3:
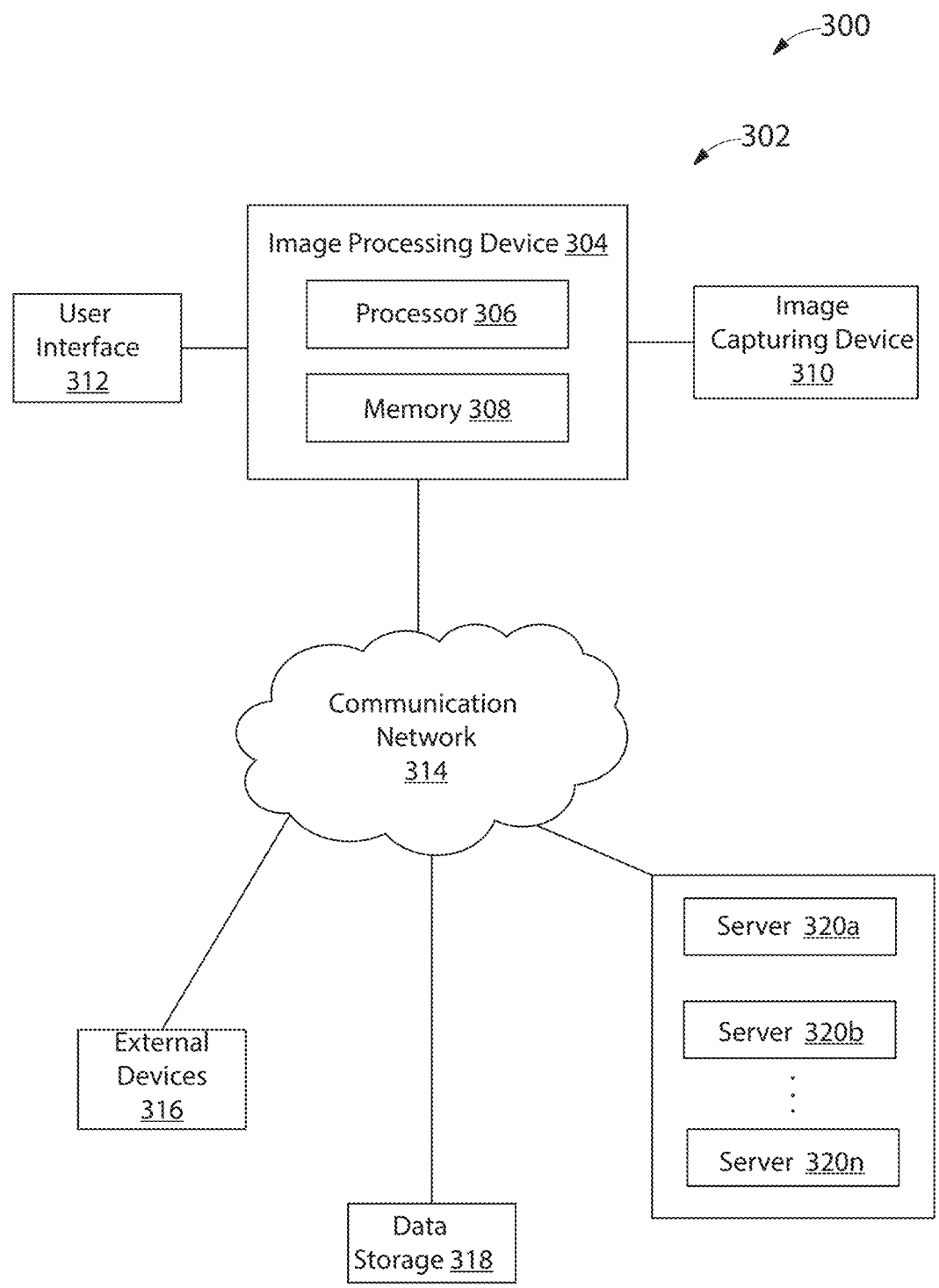
FIG. 3 illustrates a schematic layout of an image-processing system.

Now, refer to FIG. 3, which illustrates a schematic layout 300 of an image-processing system 302. The image-processing system 302 includes an image-processing device 304. Further, the image processing device 304 may include a processor 306 and a memory 308 that is communicably coupled to the processor 306. Further, the image-processing system 302 may include an image-capturing device 310 embedded in the image-processing device 304, or an externally connected to the image-processing device 304. Further, the image-processing system 302 may include a user interface 312 embedded in the image-processing device 304. It must be noted that the image processing device 304 may include a computing device having data processing capability. In particular, the image processing device 304 may have the capability to process the input images by performing contrast amplification, denoising, segmentation, and a machine-learning-based characteristic determination module to determine the physical characteristics of at least one fish.

In an illustrative configuration, the processor 306 may include suitable logic, circuitry, interfaces, and/or code that may be implemented based on temporal and spatial processor technologies, which may be known to one ordinarily skilled in the art. Examples of implementations of the processor 306 may be a Graphics Processing Unit (GPU), a Reduced Instruction Set Computing (RISC) processor, an application specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof. The memory 308 may include suitable logic, circuitry, and/or interfaces that may be configured to store processor-executable instructions for the processor 306. The memory 308 may store instructions that, when executed by the processor 306, may cause the processor 306 to initiate the process of determining the physical characteristics of the image 200. The memory 308 may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM7 (EEPROM) memory. Examples of volatile memory may include but are not limited to Dynamic Random-Access Memory (DRAM), and Static Random-Access Memory (SRAM).

In an illustrative configuration, the user interface 312 may receive input from the image-capturing device 310 and display output of the physical characteristics determined by the processor 306. For example, the user input may include images of at least one fish to be subjected to classification and segmentation. Further, the user interface 312 may include a display screen capable of displaying the physical characteristics determined by the processor 306.

In an illustrative configuration, the image-processing system 302 may further include one or more external devices 316, a data storage 318, and one or more servers 320a, 320b ... 320n (hereinafter referred to as servers 320). The one or more external devices 316 may include devices for sending and receiving various data. Examples of the one or more external devices 316 may include, but are not limited to, a remote server, digital devices, and a computer system. Also, a computing device, a smartphone, a mobile device, a laptop, a smartwatch, a personal digital assistant (PDA), an e-reader, and a tablet are all examples of external devices 316. Further, the data storage 318 may store various types of data required by the image processing device 304 to determine the physical characteristics of fish from the set of images. For example, the data storage 318 may store one or more images captured by the image capturing device 310.

In an illustrative configuration, the server 320 may include, but is not limited to, a file server, a database server, a weather server, and the like. The server 320 may be configured to provide resources, such as storage of the fish's physical attributes, which may be iteratively accessed by the processor 306. Furthermore, the resources may also include information on weather characteristics, such as wind flow and temperature associated with the site, and geology conditions, such as streamflow conditions within a predefined area at which the image 200 may be captured. Such resources may be provided by High Resolution Rapid Refresh (HRRR) maintained by the National Oceanic and Atmospheric Administration (NOAA).

In an illustrative configuration, the image processing device 304, along with the user interface 312 and the image capturing device 310, may be communicatively coupled to the data storage 318, the servers 320, and the one or more external devices 316 via a communication network 314. The communication network 314 may be a wired or a wireless network, and the examples may include, but are not limited to, the Internet, Wireless Local Area Network (WLAN), Wi-Fi, Long Term Evolution (LTE), Worldwide Interoperability for Microwave Access (WiMAX), and General Packet Radio Service (GPRS). Various devices in the image-processing system 302 may be configured to connect to the communication network 314 in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, Light Fidelity (Li-Fi), 802.16, IEEE 802.11s, IEEE 802.11g, multi-hop communication, wireless access point (AP), device to device communication, cellular communication protocols, and Bluetooth (BT) communication protocols.

The image processing device 304 may be configured to determine the physical characteristics of a fish using a physical characteristic determination tool. The physical characteristic determination tool may be implemented collectively using one or more modules, especially for pre-processing the image 200, training a machine-learning based modules for determining the physical characteristics of the fish present in the pre-processed image, and providing the user the determined physical characteristics of the fish. This is explained in detail in conjunction with FIGS. 4-12.

Figure 4:
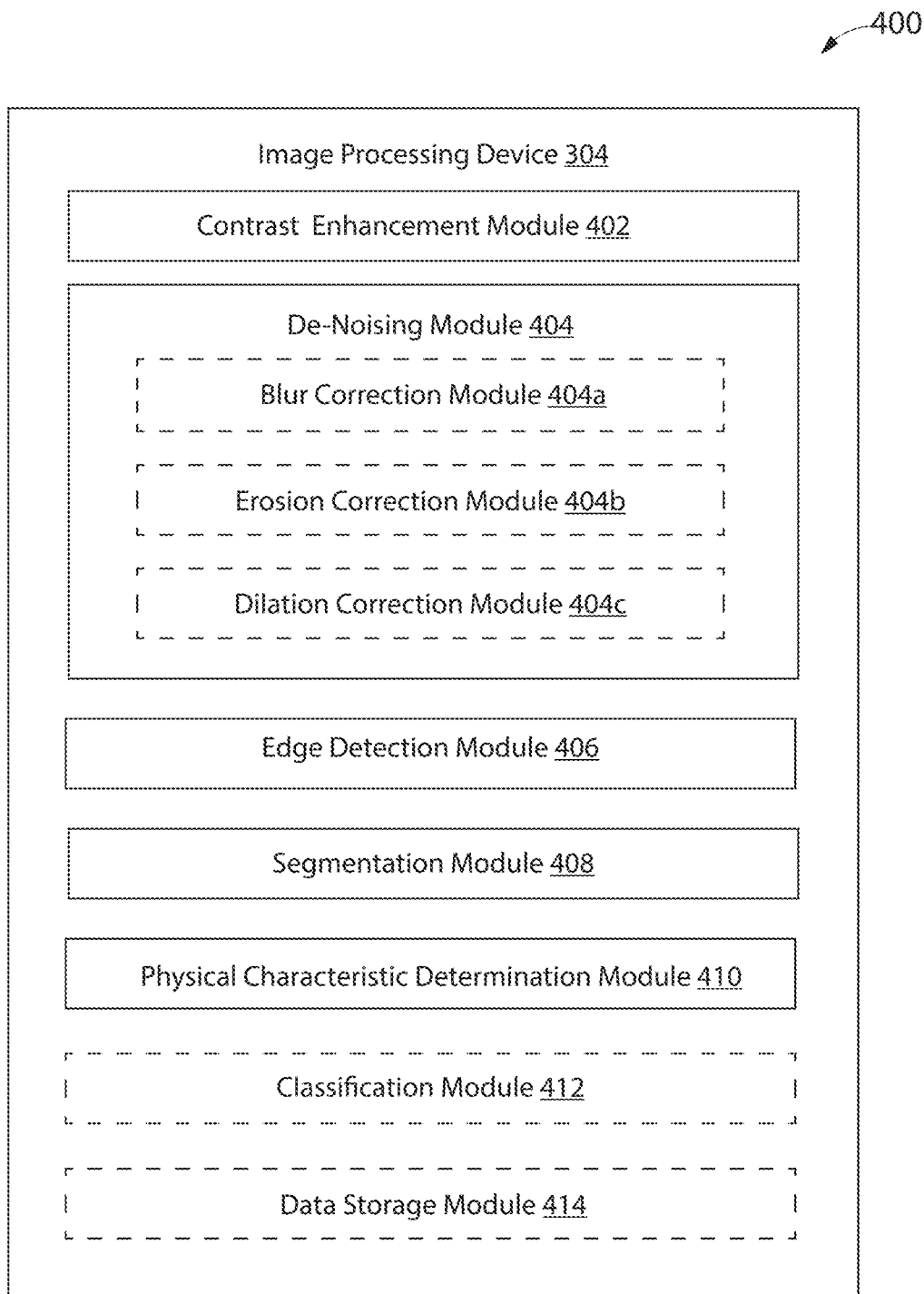
FIG. 4 illustrates a block layout of an image-processing device.

Now, refer to FIG. 4 illustrating a block layout 400 of an image-processing device 304. As explained earlier, the image processing device 304 may include the physical characteristic determination tool. The physical characteristic determination tool may be implemented using at least one module. This at least one module may further include a contrast enhancement module 402, a de-noising module 404, an edge-detection module 406, a segmentation module 408, a physical characteristic determination module 410, a classification module 412, and a data storage module 414. The contrast enhancement module 402, the de-noising module 404, and the edge-detection module 406 may be configured to perform pre-processing techniques or pre-process the set of images. The segmentation module 408 may be configured to segment the pre-processed set of images, and the physical characteristic determination module 410 may be configured to determine the physical characteristics of the fish from the set of images.

In one configuration, the contrast enhancement module 402 may be configured to receive one or more images as a set of input images associated with the fish. Further, after receiving, the contrast enhancement module 402 may apply a parametric conversion process using any parametric conversion techniques known in the art. By parametric conversion, the contrast enhancement module 402 may be configured to process the image into a computer-readable format, which may be based on illumination at particular coordinates. Further, the contrast enhancement module 402 may be configured to select a portion with the set of images of which the illumination parameters need modification. Further, the contrast enhancement module 402 may be configured to implement a contrast enhancement process on the illumination parameters for generating a contrast-enhanced image. By way of an example, the contrast enhancement process may include, but is not limited to Histogram Equalization (HE), Contrast limited Adaptive Histogram Equalization (CLAHE), Morphological enhancement at a single scale, and Multiscale Morphological Enhancement. This is explained in detail in conjunction with FIG. 5.

In one illustrative configuration, the de-noising module 404 may de-noise the contrast-enhanced image by iteratively performing a blur correction, an erosion correction, and a dilation correction using a blur correction module 404*a*, an erosion correction module 404*b*, and a dilation correction module 404*c*, to obtain a de-noised image. Furthermore, the blur correction module 404*a* may perform blur correction on the amplified-contrast image. Similarly, the erosion correction module 404*b* may perform erosion correction on the amplified-contrast image, and the dilation correction module 404*c* may perform dilation correction on the amplified-contrast image to obtain the de-noised image. In one configuration, the blur correction, the erosion correction, and the dilation correction may be performed iteratively. It should be noted that the blur correction, the erosion correction, and the dilation correction may be performed in a predefined or a random sequence. This is explained in detail in conjunction with FIG. 6.

In one configuration, the edge-detection module 406 may determine at least one pixel associated with the edges of the fish from the de-noised images using at least one edge-detection model. For example, this at least one edge-detection model may include but is not limited to Sobel Edge-detection, Prewitt edge-detection, Kirsh edge-detection, Robinson edge-detection, Marr-Hildreth edge-detection, LoG edge-detection, and Canny Edge-detection. As will be understood, the pixels associated with the edges of the fish determined within the de-noised image, when collected, may represent two-dimensional figures defining an edge-image of the fish. This is explained in detail in conjunction with FIG. 7.

In one configuration, the segmentation module 408 may be configured to identify the edges within the edge image and determine at least one anatomical part of the fish. In one configuration, the anatomical part of the fish may include but is not limited to the anterior part of the fish, such as eyes, nostrils, or other parts, such as fins, gills, and the like. After being determined, the anatomical part may be segmented into various anatomical segments using one or more segmentation processes. The one or more segmentation processes may include but are not limited to threshold-based, edge-based, region-based, clustering-based, or artificial neural network-based segmentation. The characteristic determination module may further analyze the anatomical segments to generate physical attributes and physical characteristics of the fish by the physical characteristic determination module 410.

In one configuration, the physical characteristic determination module 410 may be configured to obtain anatomical segments of the fish. The physical characteristic determination module 410 may be configured to assign more weightage to the anatomical segments. For example, the anatomical segments may include the eye, nose, and mouth, may be assigned more weightage as compared to the anatomical segments, and may include fins, tails, and the like. Accordingly, the physical characteristic determination module 410 may determine the physical attributes of the fish within the anatomical segments having higher weightage. For example, the physical characteristic determination module 410 may be configured to determine the physical attributes of the eye, nose, mouth, and the like. The physical attributes may include but are not limited to, the diameter of the eye, the diameter of the eye socket, the dimension between the eye and the nostril, and the like. After determining the physical attributes, the physical characteristic determination module 410 may implement one or more machine learning techniques to determine the physical characteristics of the fish. The physical characteristics of the fish may include length estimate, height, and even volume of the fish.

It should be noted that all such modules as mentioned earlier 402-414 may be represented as a single module or a combination of different modules. Further, as will be appreciated by those skilled in the art, each of the modules 402-414 may reside, in whole or in parts, on one device or multiple devices in communication with each other. Alternatively, each module 402-414 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but they may include disparate instructions stored in different locations, which, when joined logically together, include the module and achieve the stated purpose of the module. Indeed, a module of executable code could be a single instruction or many instructions and may even be distributed over several different code segments, among different applications, and across several memory devices.

Figure 5:
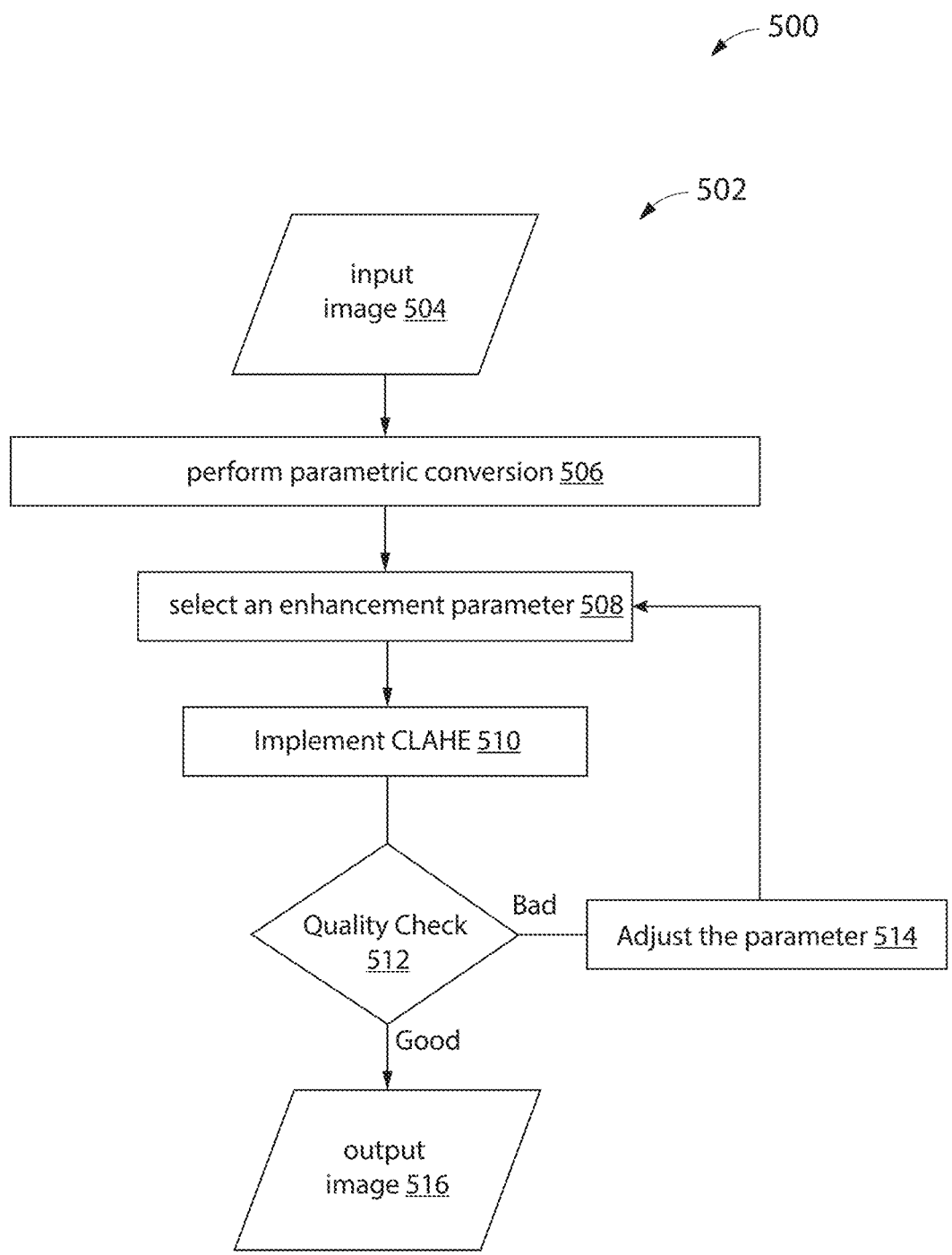
FIG. 5 illustrates a process layout of a contrast-amplification process.

Now, referring to FIG. 5, which illustrates a process layout 500 of a contrast enhancement process 502. The contrast enhancement process 502 may be implemented by the contrast enhancement module 402. The contrast enhancement process 502 may include one or more steps to process an input which may include a set of images to enhance contrast thereof. This is explained in detail hereinafter.

At step 504, the contrast enhancement module 402 may be configured to obtain a set of images as input. The set of images may be obtained from data storage 318 of the image-processing system 302 or may be imported from a database server 320. Further at step 506, the contrast enhancement module 402 may be configured to perform parametric conversion on the set of images. For example, in the parametric conversion process, a parameter associated with the image, for example, RGB (Red, Green, Blue) parameter may be converted to LAB (lightness, a-axis, b-axis) parameter. In another example, the RGB parameter may be converted to LUV (lightness, u-axis, v-axis) parameter. Once the parameter configuration of the input image is converted to the LUV (Lightness, u-axis, v-axis) configuration or the LAB (Lightness, a-axis, b-axis) configuration, the contrast enhancement module 402, at step 508, the contrast enhancement module 402 may be configured to determine a region of interest having low illumination as compared to other regions. For example, at coordinates (a1, b1) or (u1, v1) having illumination L1 lumens, as compared to coordinates (a2, b2) or (u2, v2) having illumination L2 lumens, and when L2 is less than L1, the contrast enhancement module 402 may be configured to select L2 as the parameter to be enhanced. At step 510, the contrast enhancement module 402 may be configured to implement contrast enhancement processes such as, Histogram Equalization (HE), Contrast limited Adaptive Histogram Equalization (CLAHE), Morphological enhancement at single scale and Multiscale Morphological Enhancement to modify the illumination parameter until every illumination parameters are consistent, within the image. After implementation of the contrast enhancement process, the contrast enhancement module 402, at step 512, may be configured to perform quality check for assessing the visual quality and effectiveness of the processed image. The quality check may include but is not limited to visual inspection with the original image, objective matrix, noise analysis, and the like. If the quality check reveals areas for improvement, iterative refinement by adjusting the contrast enhancement parameters or additional post-processing steps may be applied at step 514 to enhance the quality of the image further. Alternatively, if the enhanced image generated after the quality check may include no areas of improvement, a contrast-enhanced image will be generated at step 516 as an output.

The contrast-enhanced image generated from the contrast enhancement process 502 may be further received by the de-noising module 404. The de-noising module 404 may be configured to implement a de-noising process on the contrast-enhanced image to obtain a de-noised image.

Figure 6:
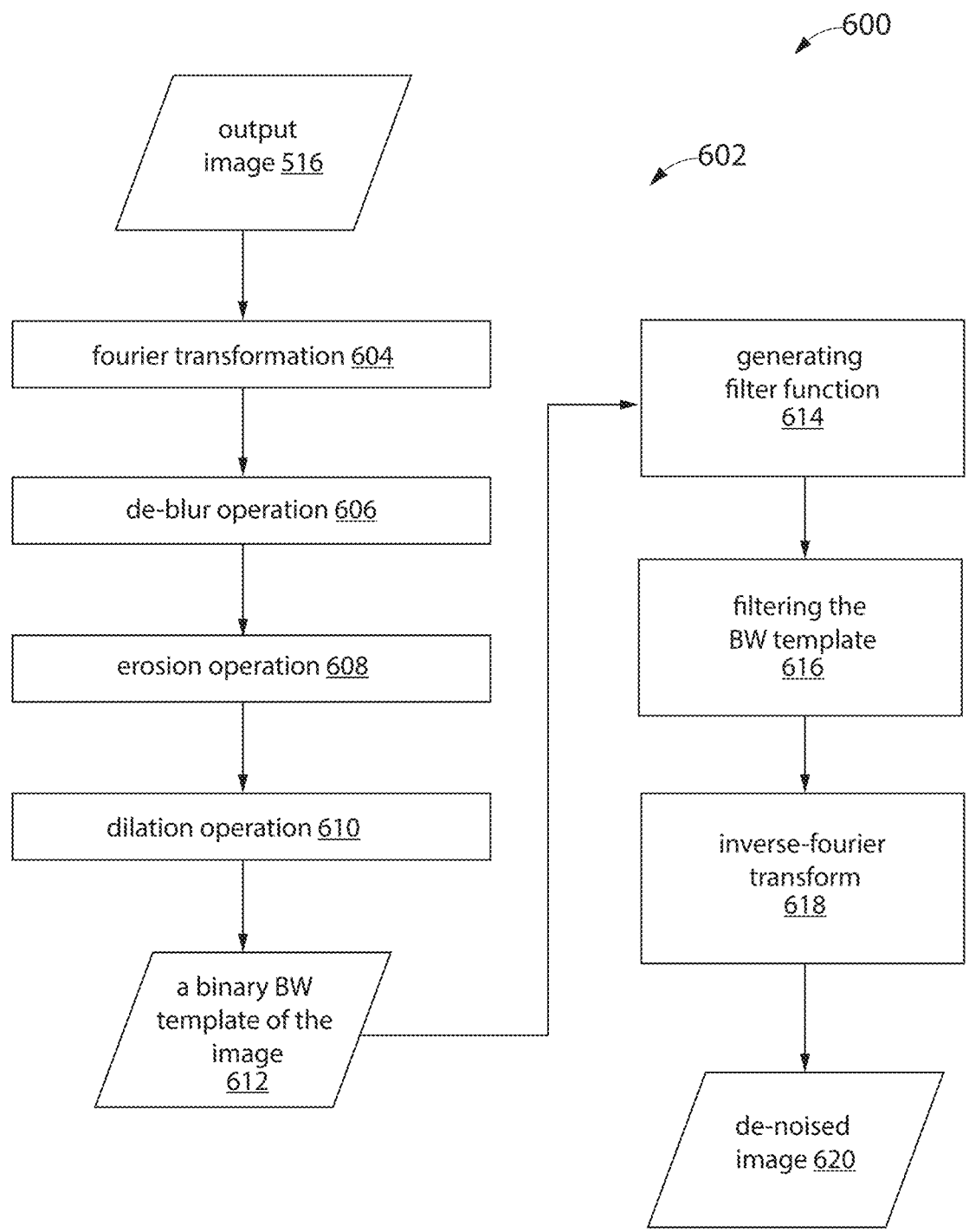
FIG. 6 illustrates a process layout of a de-noising process.

Now, FIG. 6 illustrates a process layout 600 of the de-noising process 602 on the contrast-enhanced image. At step 604, the de-noising module 404 may be configured to receive the contrast-enhanced image generated from the contrast enhancement process 502. Further, at step 606, the contrast enhancement module 402 may be configured to implement a Fourier transform on the contrast-enhanced image to transform the image into a frequency domain, which may enable the application of frequency filtering to reduce noise in the image. In an exemplary configuration, to implement Fourier transform on the image, the following equation may be used:

$$F(u,v) = \iint I(x,y) \cdot e^{-j2\pi(ux+vy)} dx dy \tag{1}$$

Where:
F(u,v) is the 2D Fourier Transform of the image;
I(x,y) is the intensity at spatial coordinates (x,y) within the image;
u and v are the spatial frequency coordinates in the frequency domain;
e is the base of the natural logarithm; and
j represents the imaginary unit ($\sqrt{(-1)}$).

After transforming the contrast-enhanced image into the frequency domain, at step 606, the de-noising module 404 may be configured to de-blur the contrast-enhanced image (in frequency domain) using blur correction module 404A with one or more de-blur techniques, such as by multiplying the blurred image with a deconvolution filter. The deconvolution filter may include, but not limited to a Wiener Filter, Richardson-Lucy Deconvolution, Regularized Inverse Filter, Gaussian Blur Inversion, and the like, to generate a de-blurred contrast-enhanced image. Further, at step 608, the de-blurred contrast-enhanced image may be further subjected to erosion operation using erosion correction module 404B. In the erosion operation, the noise present in small, isolated regions, or pixels may be eroded or removed. This operation is iterated until an eroded, de-blurred and contrast-enhanced image may be generated. Further, after erosion operation, at step 610, the eroded, de-blurred, and contrast-enhanced image may be further subjected to dilation operation using dilation correction module 404C. The dilation correction module 404C may be configured to enhance features in the image, after erosion operation. By applying dilation operation after erosion operation, small gaps or missing parts in the eroded, de-blurred, and contrast-enhanced image can be filled, resulting in smoother and more connected regions therein. After the dilation operation, at step 612, a binary black-white (BW) image template of the eroded, de-blurred, and contrast-enhanced image typically having expanded, or thicker foreground regions may be generated. Further, the template may be filtered using one or more filter operations and transformed from the frequency domain to the spatial domain. At step 614, the de-noising module 404 may be configured to generate a filter function for the binary black-white (BW) image template. The filter function may specify how the frequency components of the image should be modified before transforming back to the spatial domain. Examples of the filter function may include, but are not limited to Gaussian filter, Butterworth filter, Ideal lowpass filter, Wiener filter, and the like. For example, the Gaussian filter may be designed using the following function:

$$H(u, v) = e^{-\frac{D(u,v)^2}{2\sigma^2}} \tag{2}$$

Where D(u,v) is the Euclidean distance from the origin in the frequency domain, and σ controls the width of the Gaussian distribution. Further, after the filter function is determined, at step 616, the de-noising module 404 may be configured to filter the image by performing a basic multiplication function of the filter function with the Fourier transform of the template to obtain a filtered template. For example, the filtered template can be generated as $$F(t) = F(u,v) \cdot G(u,v) \tag{3}$$

After filtering the template, at step 618, the de-noising module 404 may be configured to perform an inverse Fourier transform to convert the filtered template from the frequency domain to the spatial domain. For example, the de-noising module 404 may be configured to perform an inverse Fourier transform on equation (3). As a result, at step 620, a de-noised image is obtained.

The de-noised image obtained from step 620 may be further subjected to an edge-detection process 702 using the edge-detection module 406 to identify edge pixels of at least one fish and create an edge image thereof. The features extracted may be used for further analysis, such as object recognition, classification, or segmentation.

Figure 7:
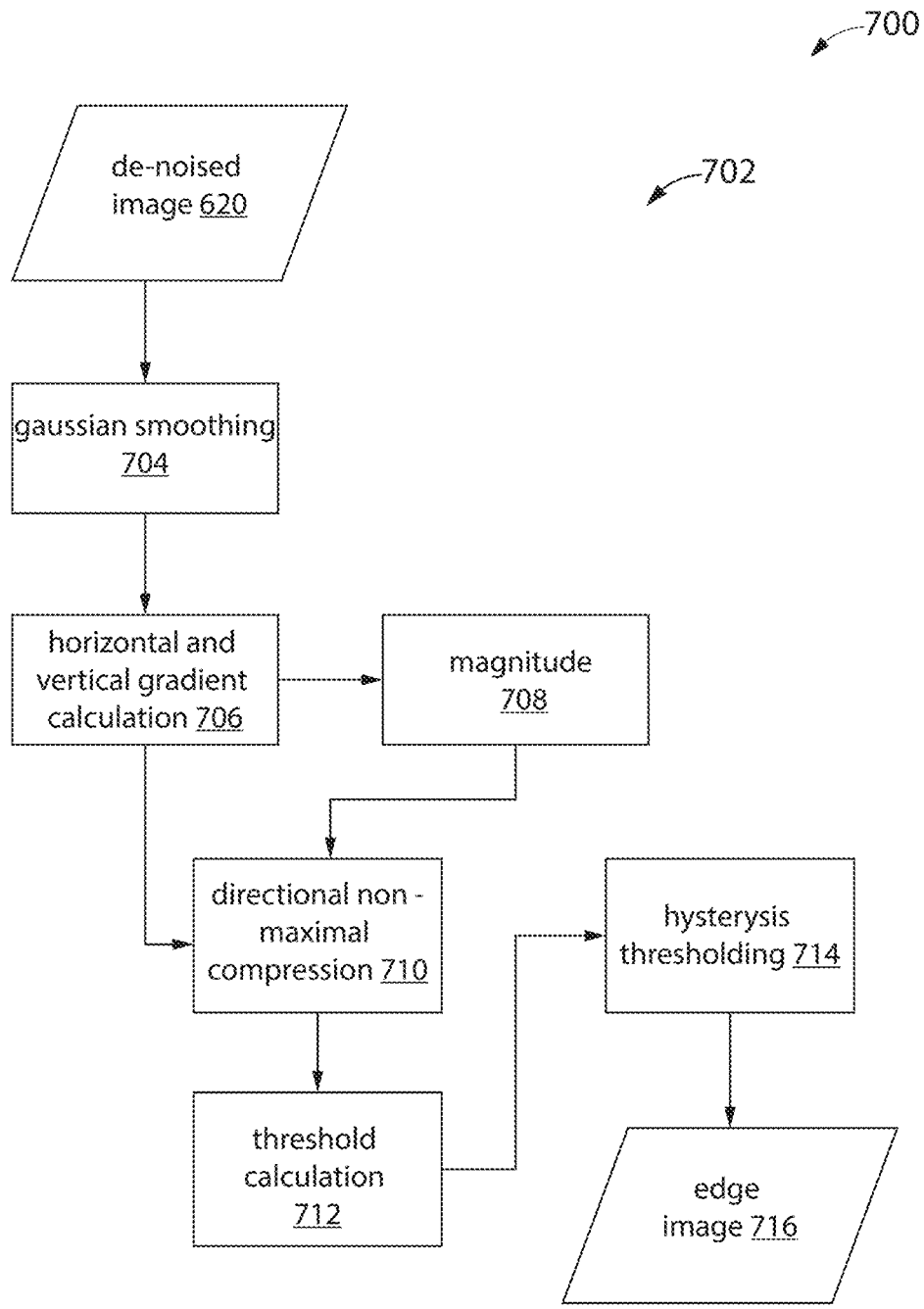
FIG. 7 illustrates a process layout of an edge-determination process.

In an illustrative configuration, FIG. 7 illustrates the edge-detection process 702. The edge-detection process 702 may be implemented on the de-noised image by the edge-detection module 406. In an illustrative configuration, the edge-detection process 702 may be initiated by obtaining the de-noised image generated from step 620 of the de-noising process 602. Further, at step 704, the edge-detection module 406 may be configured to implement a Gaussian smoothing process. Particularly, the edge-detection module 406, using the Gaussian smoothing operation, may be configured to apply a low-pass filter to the de-noised image, while attenuating high-frequency noise and preserving the underlying structures and edges in the de-noised image to generate a smoothed image. Further, after Gaussian smoothing, at step 706, the edge-detection module 406 may be configured to compute gradients, particularly horizontal and vertical gradients within the smoothed image. For example, the edge-detection module 406 may be configured to detect gradients or changes in intensity or color to rule out possibilities of false detection and spurious edges within the smoothed image. Further, the edge-detection process 702 at step 708 may be configured to determine the magnitude of the gradient, and simultaneously, the edge-detection process 702 at step 710 may be configured to perform directional non-maximum compression, or directional non-maximum suppression (NMS) of the gradients calculated from step 706. The directional non-maximum compression may be configured to analyze the magnitude of the gradient (obtained from step 708) to determine a local maxima, or pixels where the magnitude of the gradient is maximum within the image. The gradient may be maximum for the edges of at least one fish and may be lower for the background surrounding at least one fish. Further, during the directional non-maximum compression, the edge-detection module 406 may be configured to retain the pixels having maximum gradient values as edge pixels and suppress the other pixels having magnitude less than the maximum gradient magnitude to separate the edges of the fish from the background. Further, at step 712, the edge-detection module 406 may be configured to analyze the local maximum edge pixels against a threshold magnitude using a gradient operator such as the Sobel or Prewitt operators. Further, the edge-detection module 406 may be configured to determine the edge pixels having a magnitude greater or less than the threshold magnitude. Accordingly, edge pixels with a gradient magnitude greater than the threshold magnitude may be classified as strong edge pixels, and edge pixels with a gradient magnitude less than the threshold magnitude may be classified as weak edge pixels. Further, the strong edge pixels and the weak edge pixels may be analyzed for hysteresis thresholding at step 714, in which the edge-detection module 406 may be configured to determine a relationship between the weak edge pixel with the strong edge pixel. For example, the edge-detection module 406 may be configured to check that the weak edge pixel is considered part of the strong edge pixel. This process is recursively applied to all connected weak edge pixels, forming a continuous edge of the fish. Also, the edge pixels not connected to strong edge pixels are discarded as noise. After the formation of the edges, at step 716, the edge-detection module 406 may be configured to generate an edge image as output. The edge image may be further processed for image segmentation, described hereinafter.

Figure 8:
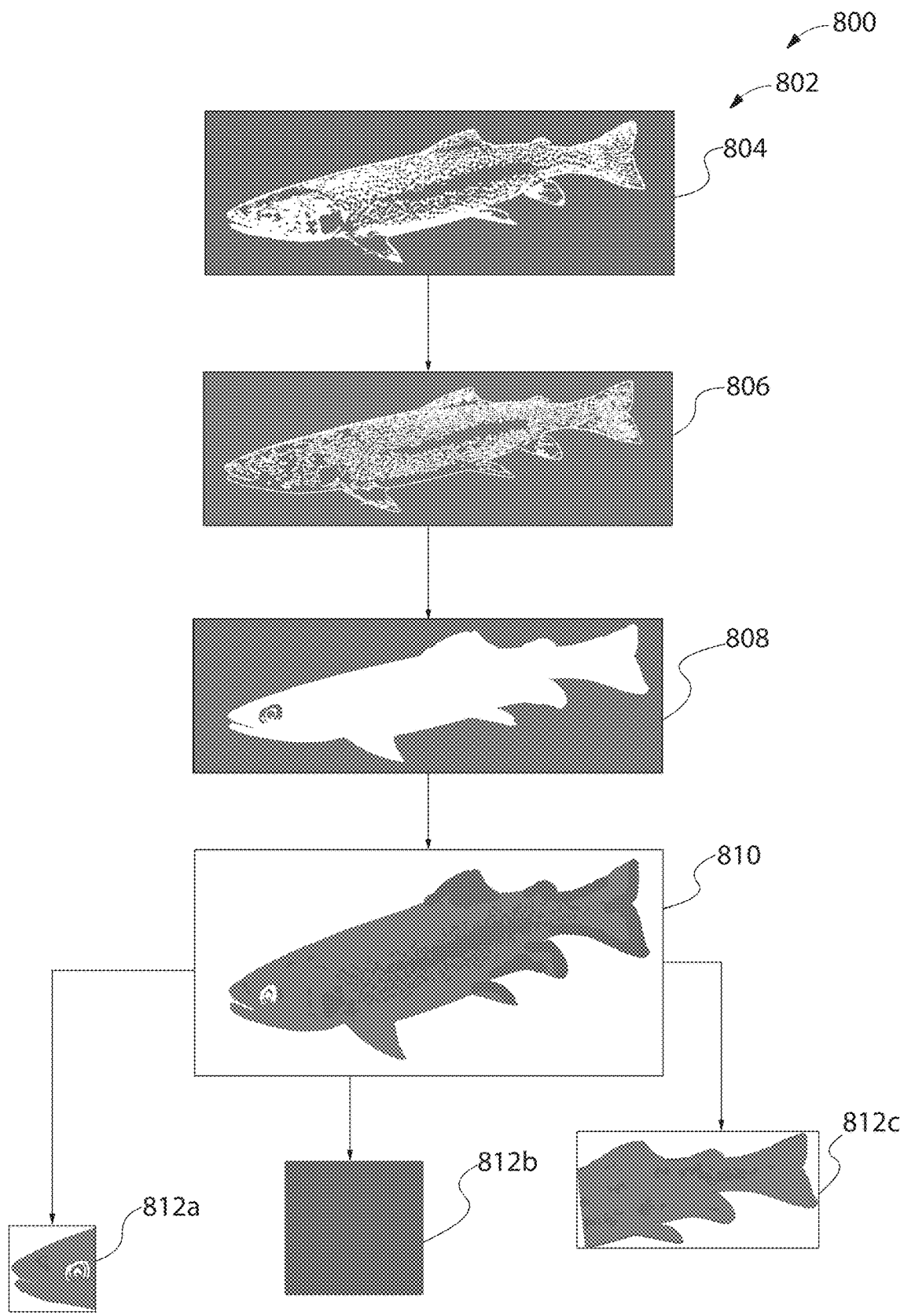
FIG. 8 illustrates an image segmentation process.

In an illustrative configuration, FIG. 8 illustrates a process layout 800 of the segmentation process 802. The segmentation process 802 may be implemented by the segmentation module 408. The segmentation process 802 may be initiated by the edge image generated at step 716 may be received by the segmentation module 408. The segmentation module 408 may be configured to perform image segmentation process 802 on the edge image. The image segmentation process 802 may include partitioning the edge image based on a predefined criteria. The predefined criteria may include segmenting the image based on one or more anatomical parts of the fish. For example, the anatomical parts may involve an eye pupil or an eye socket of the fish, a nostril, a lateral line, a pelvic fin, a dorsal fin, a caudal fin, and the like. These anatomical segments can be identified using region growing, contour models, human annotations, and the like.

With continued reference to FIG. 8, the images 804, 806, 808, and 810 may be obtained as an output yielded by the contrast enhancement process 502, de-noising process 602, edge-detection process 702, respectively. The image 810 may be analyzed during the segmentation process 802 by the segmentation module 408 and may be segmented into anatomical segments 812a, 812b, and 812c based on the predefined criteria. In an illustrative configuration, the anatomical segments 812a, 812b, and 812c may represent anatomical segments of the fish. For example, the anatomical segment 812a may represent anatomical segments such as the nostril, eye pupil, and eye socket, while the anatomical segment 812b may represent anatomical segments such as the anal fin, gills, and the like. Further, the anatomical segment 812c may represent anatomical segments such as the dorsal fin, the caudal fin, and the like. It must be noted that the segmentation process 802 may not limit the segment the images 810 to the said anatomical segments. The segmentation process 802 may segment the images 810 into more than three anatomical segments, based on the predefined criteria and the anatomical segments of which the physical characteristics are to be determined.

In an illustrative configuration, as explained earlier, the physical characteristic determination module 410 may be configured to determine the physical attributes of the anatomical segments 812a, 812b, and 812c. Further, based on the physical attributes, the physical characteristic determination module 410 may be configured to determine the physical characteristics of the fish.

In an illustrative configuration, the physical characteristic determination module 410 may include a characteristic-determination machine-learning model, which may be trained by the processor 306 using one or more input data to generate a trained characteristic-determination machine-learning model. The one or more input data may include publicly available data obtained from server 320, such as a measurement database storing dimensions of various fishes, which may include the diameter of the eye, length corresponding to the diameter of the eye, and the image database which stores at least one image of the fish. During training, the trained characteristic-determination machine-learning model may be rigorously tested by the processor 306 with various sample images of the fish and may be optimized until the trained model achieves a target efficiency. Further, the trained characteristic-determination machine-learning model may be configured to determine at least one physical attribute of a target anatomical segment from the anatomical segments 812a, 812b, and 812c. Based on at least one physical attribute of the target anatomical segment, the trained characteristic-determination machine-learning model may use one or more methodologies to determine the physical characteristics of the fish. The determined physical characteristics of the fish may be displayed on the user device implemented with the image-processing system 302, with the user interface 312.

Moreover, the trained characteristic-determination machine-learning model may be refined iteratively, based on one or more feedback from an end user, using human-in-the-loop (HITL) approach. The end-user may be configured to provide feedback on the physical characteristics determined by the physical characteristic determination module 410 through the user interface 312. Accordingly, the processor 306, using the feedback from the HITL approach, along with the image database and measurement database, may be configured to iteratively refine the trained characteristic-determination machine-learning model to a refined characteristic-determination machine-learning model. The refined characteristic-determination machine-learning model may further determine the physical characteristics with higher precision.

The physical characteristics determination machine-learning model may be based on a gradient tree-boosting algorithm. In particular, the machine learning models may utilize a R-Convolution Neural Network (R-CNN), or Fast-TreeTweedie algorithm in the ML.NET framework. Alternative machine learning models such as simple-stress regression models could be used, but the gradient tree-boosting algorithm (decision tree) ensembles may provide better performance and may therefore be preferred. Further, other alternative machine learning models may include common regression models, linear regression models (e.g., ordinary least squares, gradient descent, regularization), decision trees and tree ensembles (e.g., random forest, bagging, boosting), generalized additive models, support vector machines, and artificial neural networks, among others. The physical characteristics determination machine-learning model may be configured to determine the physical characteristics of the fish using a physical characteristic determination method, which is described in detail hereinafter.

Figure 9:
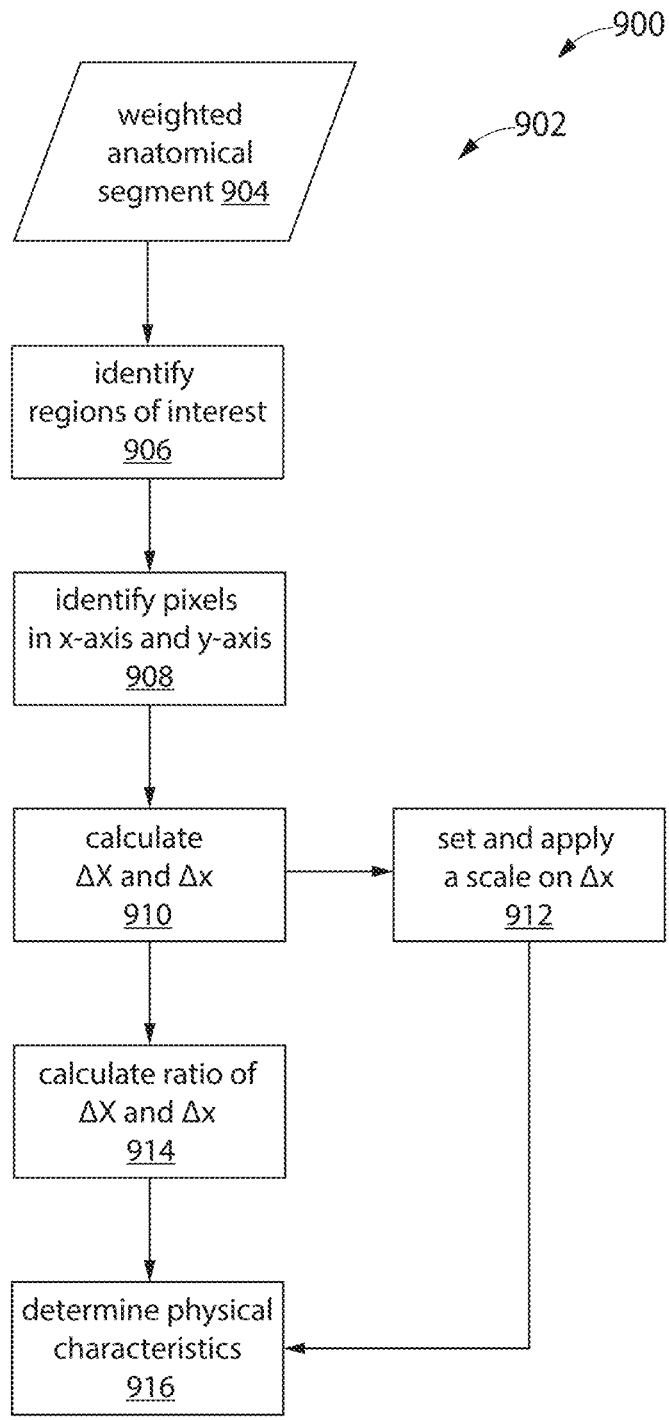
FIG. 9 illustrates a process layout of a physical characteristic determination process.

Now, FIG. 9 illustrates a process layout 900 of the physical characteristic determination method 902. The physical characteristic determination method 902 may be initially configured to determine a target anatomical segment. The target anatomical segment may be determined based on identifying prioritized segments within the anatomical segments 812a, 812b, and 812c. The prioritized segments may be identified based on the weightage assigned to each anatomical segment 812a, 812b, and 812c. The weightage, for example, may be assigned based on predefined weightage criteria. The predefined weightage criteria may include assigning higher weightage to each of the anatomical segments, including the nostril, eye pupil, or an eye socket, as compared to the anatomical segments including the anal fin, dorsal fin, and the like. For example, the anatomical segment 812a may be assigned higher weightage as compared to the anatomical segments 812b and 812c, as the anatomical segment 812a may include the eye pupil, eye socket, and nostril.

Further, at step 906, the physical characteristic determination module 410 may be configured to determine at least one region of interest. This at least one region of interest may include a first region of interest, in which a bounding box may be determined, which encloses the target anatomical segment. Further, this at least one region of interest may include a second region of interest, which may illustrate a bounding box completely enclosing the fish. Further, at step 908, the physical characteristic determination module 410 may be configured to identify pixels associated with the target anatomical segment, which may be defined by the anatomical segment 812a. For example, the physical characteristic determination module 410 may be configured to identify pixels covering the eye pupil, or the eye socket, in the x-direction (horizontal), and the y-direction (vertical). Accordingly, at step 910, the physical characteristic determination module 410 may be configured to calculate the dimension of the first region of interest ($\Delta x$) and the dimension of the second region of interest ($\Delta X$). Further, at step 912, the physical characteristic determination module 410 may be configured to apply an appropriate scale on the dimension of the first region of interest ($\Delta x$) to convert the pixels therein into centimeters or meters. The dimension of the first region of interest (after being converted) may be represented as the physical attribute of the fish. Simultaneously, at step 914 the physical characteristic determination module 410 may be configured to calculate a dimension ratio of the dimension of the second region of interest ($\Delta X$) to the dimension of the first region of interest ($\Delta x$) may be determined. At step 916, the dimension ratio may be multiplied by the dimension of the first region of interest to determine the physical characteristics of the fish.

Figure 10:
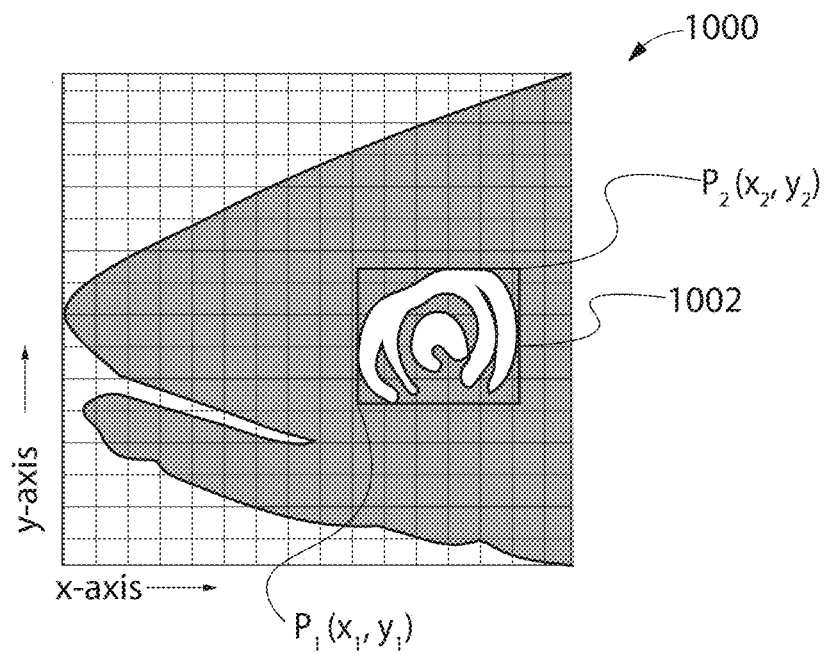
FIG. 10 illustrates a close-up view of a bounding box enclosing a first region of interest.
Figure 11:
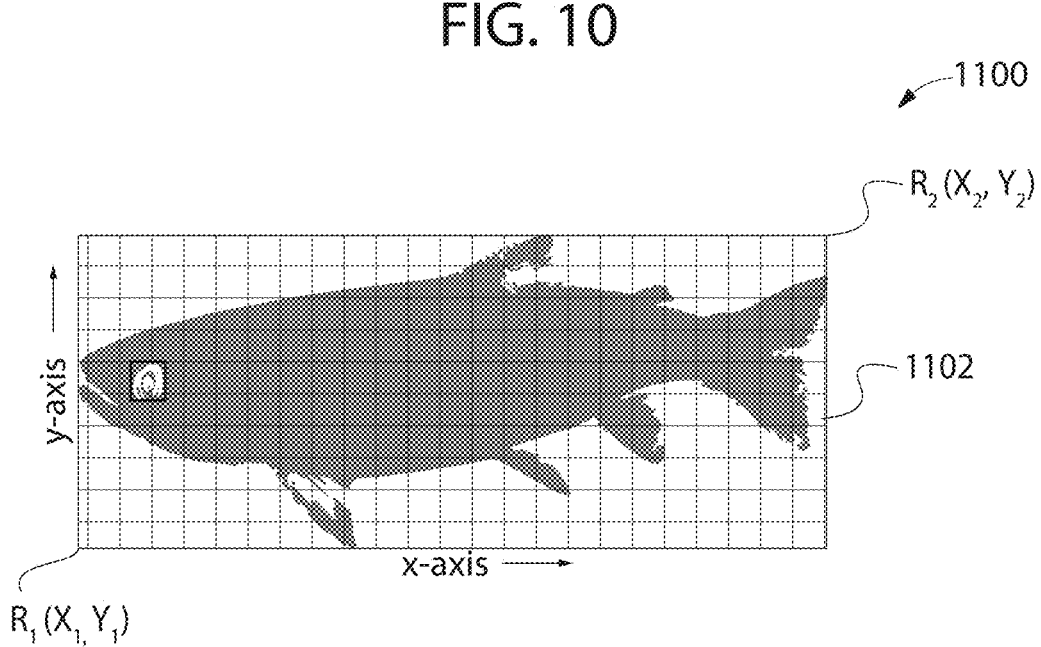
FIG. 11 illustrates a close-up view of a bounding box enclosing a second region of interest.

Now, FIG. 10 illustrates a close-up view 1000 of a bounding box enclosing a first region of interest, and FIG. 11 illustrates a close-up view 1100 of a bounding box enclosing a second region of interest. As explained earlier, the physical characteristic determination module 410 may be configured to identify the first region of interest defined by the mini-bounding box 1002, which may encompass pixels defining the eye pupil or the eye socket in x-direction (horizontal) and the y-direction (vertical). The pixels identified, which may cover the eye pupil or the eye socket may be selected and isolated using the mini-bounding box 1002 of the first region of interest. Further, the physical characteristic determination module 410 may be configured to determine the coordinates of the pixels at the corners ($P_1$, $P_2$) of the mini-bounding box, as $P_1(x_1, y_1)$, and $P_2(x_2, y_2)$. In one configuration, the physical characteristic determination module 410 may be configured to determine dimensions of the first region of interest in the vertical direction (y-axis) and the horizontal direction (x-axis). The dimensions of the first region of interest in the vertical direction (y axis) and the horizontal direction (x-axis) may be calculated using:

Horizontal distance=$(\Delta x)=(x_2-x_1)/px$; and

Vertical distance=$(\Delta y)=(y_2-y_1)/px$;

Further, the horizontal and vertical distances may be converted into real-time horizontal and vertical distances using an appropriate conversion scale. For example, if the conversion scale 1:10, i.e., 1 centimeter covers 10 px (unit of a pixel dimension), then the dimension of the horizontal distance and the vertical distance may be converted to real-time dimensions (in centimeters). Accordingly, the real-time dimensions of the mini-bounding box 1002 may be mapped to the eye pupil or the eye socket for deriving an estimate of the physical attributes of the fish. For example, if the dimensions of mini-bounding box 1002 may be 6 px in the x-direction, and 5 px in the y-direction, then the real-time dimension of the mini-bounding box 1004 may be 0.6 centimeters in the x-direction, and 0.5 centimeters in y-direction. Therefore, the physical attributes, i.e., physical dimensions of the eye may be about 0.6 centimeters in the x-direction, and 0.5 centimeters in y-direction.

After determining the physical attribute, the physical characteristic determination module 410 may be configured to determine the dimensions of the second region of interest, which is defined by the bounding box 1102. The second region of interest may enclose the pixels defining the fish. Similar to the mini-bounding box 1002, the physical characteristic determination module 410 may be configured to determine dimensions of the bounding box 1102, based on coordinates of the pixels at the corners ($R_1$, $R_2$) of the bounding box 1102, as $R_1(X_1, Y_1)$, and $R_2(X_2, Y_2)$. In one configuration, the physical characteristic determination module 410 may be configured to determine the dimensions of the second region of interest in the vertical direction (y-axis) and the horizontal direction (x-axis). The dimensions of the first region of interest in the vertical direction (y axis) and the horizontal direction (x-axis) may be calculated using:

Horizontal distance=$(\Delta X)=(X_2-X_1)/px$; and

Vertical distance=$(\Delta Y)=(Y_2-Y_1)/px$;

Further, the physical characteristic determination module 410 may be configured to determine a horizontal distance ratio $(\Delta x)/(\Delta X)$ and a vertical distance ratio $(\Delta y)/(\Delta Y)$. Further, to determine the physical characteristics of the fish, the physical characteristic determination module 410 may be configured to analyze the horizontal distance ratio $(\Delta x)/(\Delta X)$ and the vertical distance ratio $(\Delta y)/(\Delta Y)$ with the physical attributes, i.e., real-time horizontal distance and the real-time vertical distance to determine the physical characteristics of the fish, i.e., length and height of the fish. The physical characteristic determination module 410, using the height and length estimated, may also be configured to determine the volume of the fish. The height and length estimated may be calculated as:

$$\text{Length of the fish} = (x_2 - x_1)\frac{\Delta x}{\Delta X}\text{(centimeters); and}$$

$$\text{Height of the fish} = (y_2 - y_1)\frac{\Delta y}{\Delta Y}\text{(centimeters).}$$

In addition to calculating the physical characteristics of the fish, the image processing device 304 may also be configured to determine the fish species of which the physical characteristics are estimated. Such determination of the species of the fish may be implemented by the classification module 412. The classification module 412 may be configured to obtain the estimate of the physical characteristics of the fish generated by the physical characteristic determination module 410 and may also obtain species information from the servers 320. Further, the classification module 412 may be configured to obtain the species information corresponding to the estimate of the physical characteristics of the fish from the servers 320. In one configuration, the classification module 412 may be configured to map the estimate of the physical characteristics of a relevant fish from species information. Additionally, on temporarily capturing the fish, the user may also enter fish data through the user interface 312. For example, while capturing the fish, the user may experience a change in behavior (aggressive, dormant) of the fish, or other anatomical features such as the presence of teeth, the shape of the fins, and the like. The user may feed this information to the image-processing system 302 using the user interface 312. Therefore, the classification module 412 may be configured to analyze the information pertaining to the capture of the fish, in addition to the physical attributes and characteristics determined by the physical characteristic determination module 410, and the species information from the servers 320 to determine the species of the fish.

Figure 12:
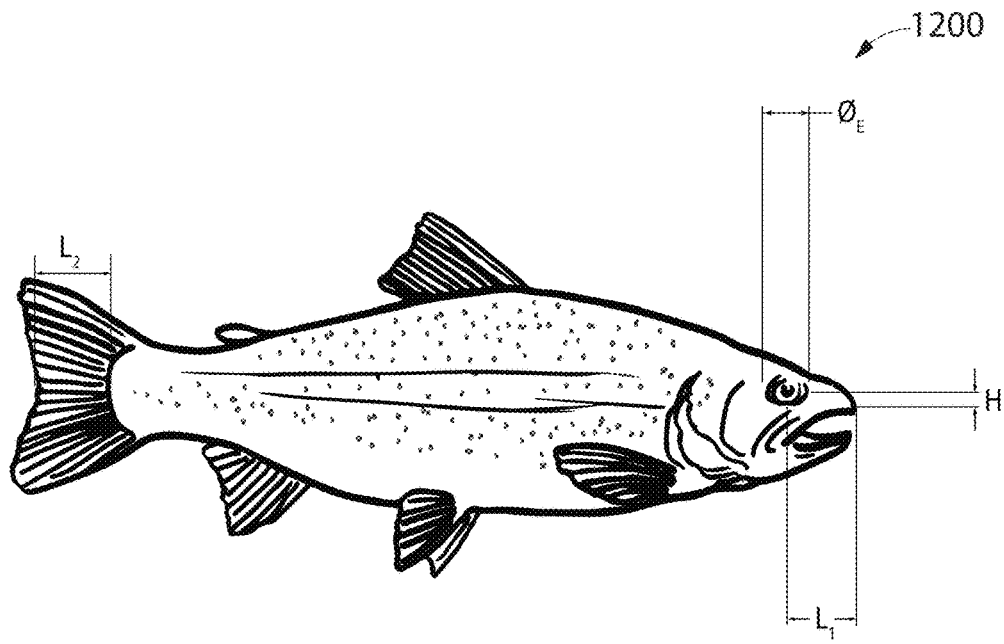
FIG. 12 illustrates a schematic of a fish belonging to class I species.
Figure 13:
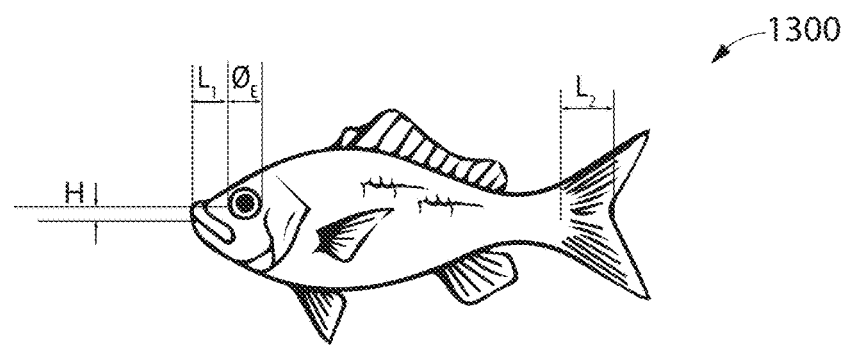
FIG. 13 illustrates a schematic of a fish belonging to class II species.
Figure 14:
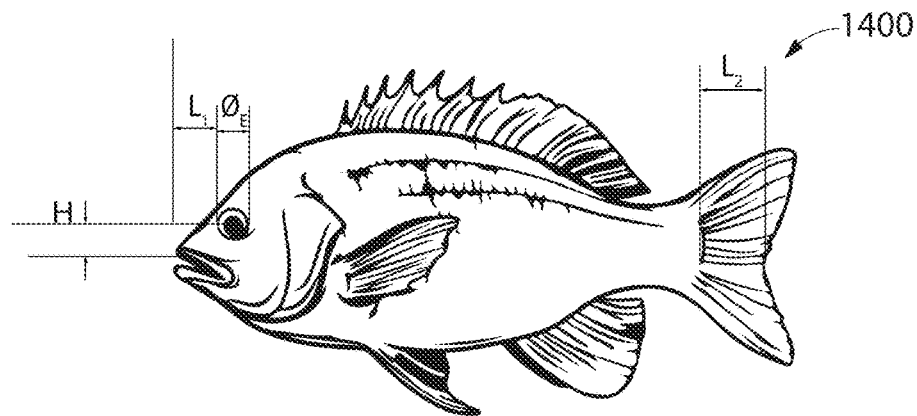
FIG. 14 illustrates a schematic of a fish belonging to class III species.

In an illustrative configuration, FIG. 12 illustrates a schematic 1200 of a fish belonging to class I species, FIG. 13 illustrates a schematic 1300 of a fish belonging to class II species, and FIG. 14 illustrates a schematic 1400 of a fish belonging to class III species.

As explained earlier, the classification module 412 may be configured to obtain and analyze species information from the server 320, the physical characteristics estimated by the physical characteristic determination module 410, and the information pertaining to the capture of the fish. The classification module 412 may be configured to map the physical characteristics estimated by the physical characteristic determination module 410, and the information pertaining to the capture of the fish to the species information obtained from the server 320. In one configuration, the species information may be stored in the server 320 and may include, but not limited to, data related to various species discovered or historical data, the physical characteristics of previously captured fish, and the like. The species information may be stored in the server 320 as lookup tables, which may be accessed iteratively by the physical characteristic determination module 410 for obtaining the species information. In one configuration, an exemplary lookup table is illustrated below:

TABLE

Lookup table on species information
Species Information

| Species | Characteristics (inch) | | | | Body Features | Body Pattern | Behavior |
| | $\Phi_E$ | $L_1$ | $L_2$ | H | | | |
| --- | --- | --- | --- | --- | --- | --- | --- |
| I | 0.4 | 0.6 | 1.8 | 0.3 | Long, presence of teeth | Dotted | Aggressive |
| II | 0.2 | 0.4 | 2 | 0.15 | Extended Dorsal fin | Scarred | Dormant |
| III | 0.34 | 0.42 | 1.28 | 0.23 | Pointed caudal fin | Scaled (small) | Dormant |

The classification module 412 may be configured to map the physical characteristics and the information pertaining to the capture of the fish to species information, or for example, to the lookup table illustrated above. For example, if the physical characteristics determined may include width of the eye ($\Phi_E$) as 0.19 inch, height (H) between the eyes and the mouth cavity as 0.13 inch, distance ($L_1$) between the eye and the nostril as 0.23 inch, and length of the caudal fin ($L_2$) as 1.88 inch, and the user gave an input stating the captured fish was dormant, the classification module 412 may be configured to lookup in the table to identify the type of species. Based on the findings, the classification module 412 may be configured to determine that the fish belongs to class III species.

As explained earlier, the image-processing system 302 may be implemented through image-processing device 304. Particularly, the image-processing system 302 may be implemented as a software tool in user devices, referring to electronic devices employed by end-users. The image-processing system 302 may be configured to deploy various methodologies, such as pre-processing the set of images, segmenting the pre-processed images, and determining the physical characteristics of fishes present in the image using modules 402-414. This is explained in detail in conjunction with FIG. 15.

Figure 15:
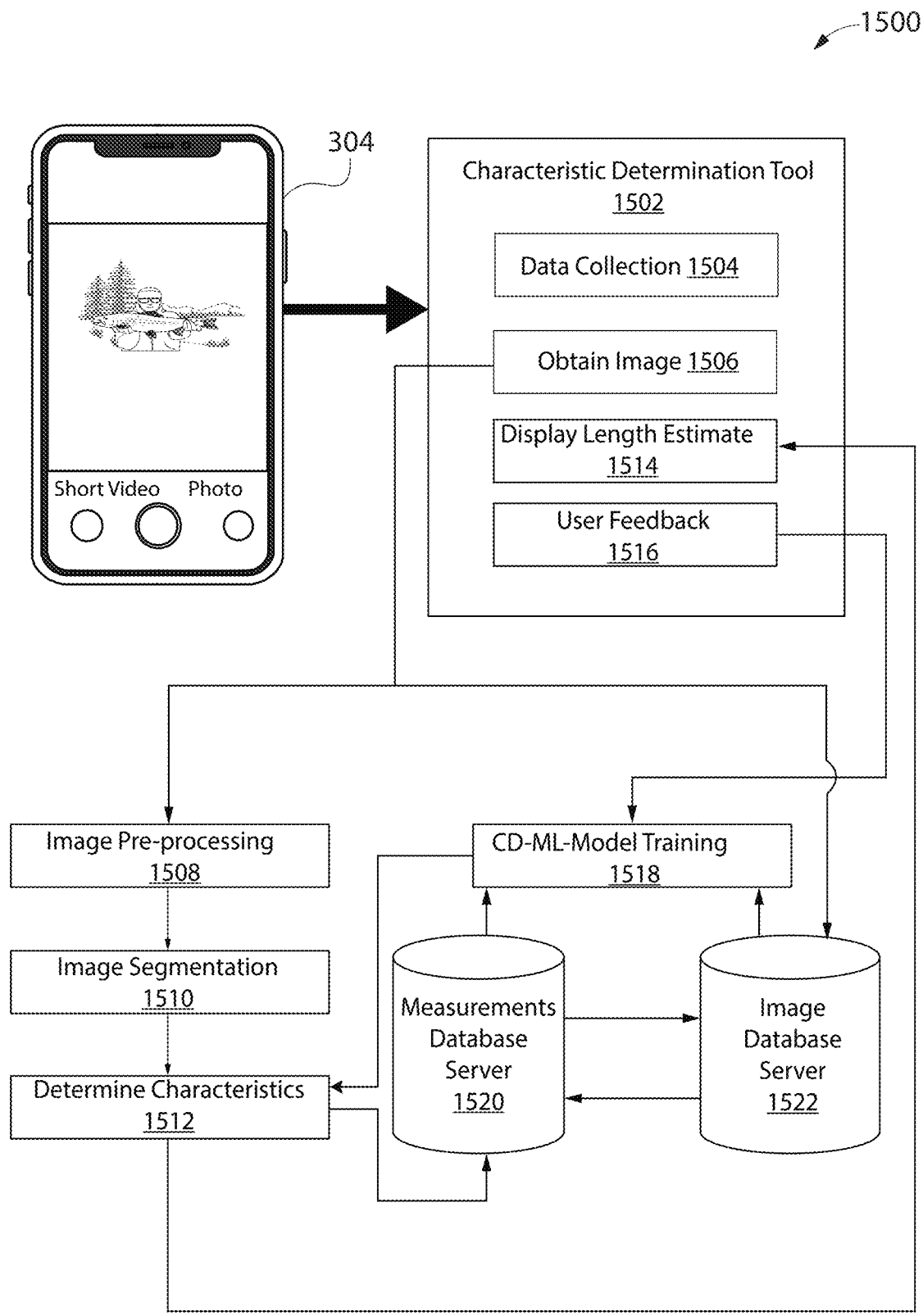
FIG. 15 illustrates a process layout of the physical characteristic determination process implemented by the image-processing system when embedded as a physical characteristic tool in the user device.
Figure 16:
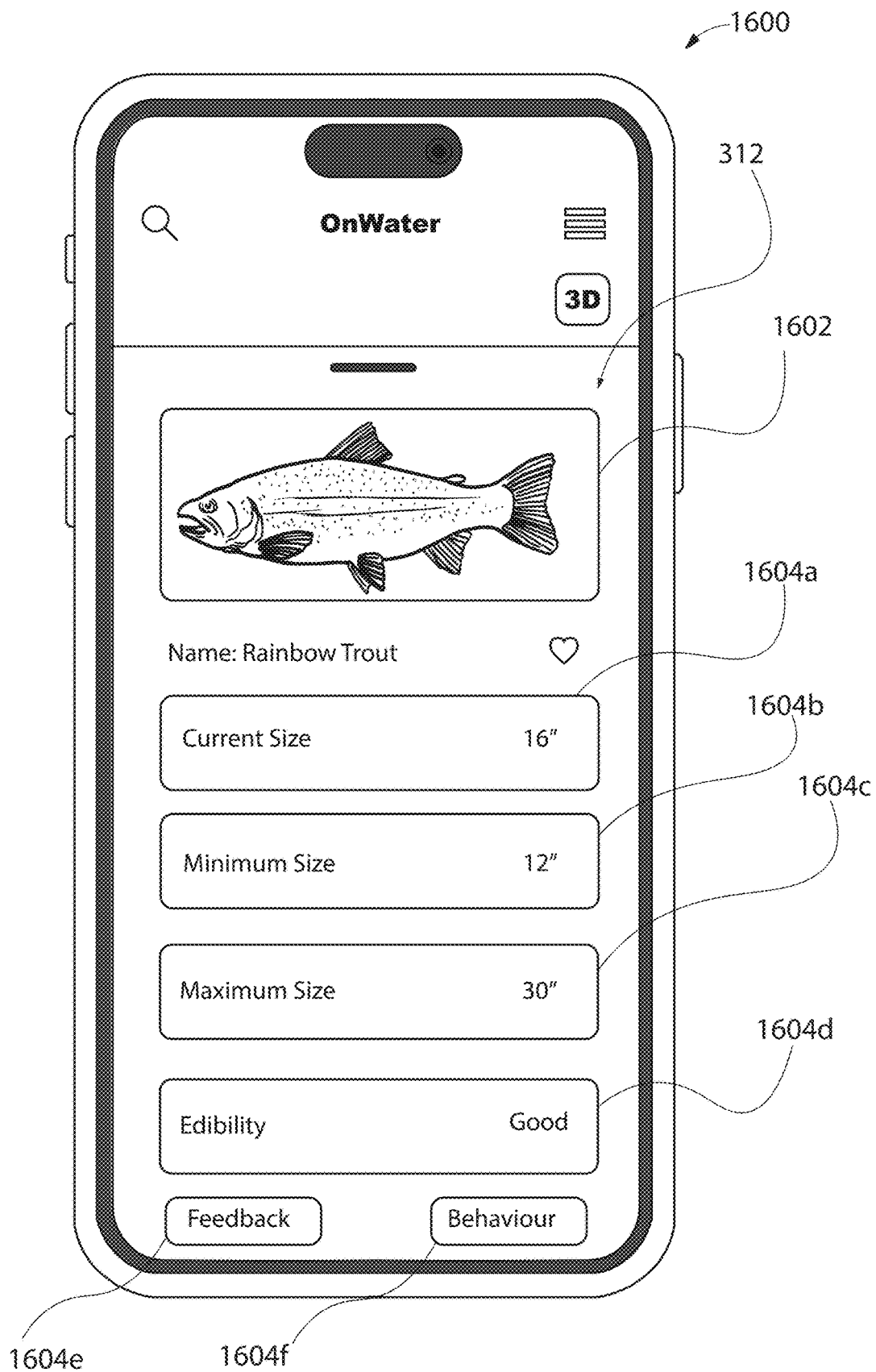
FIG. 16 illustrates a schematic of an image processing device displaying the physical characteristics of the fish through the user interface of the user device.
Figure 17:
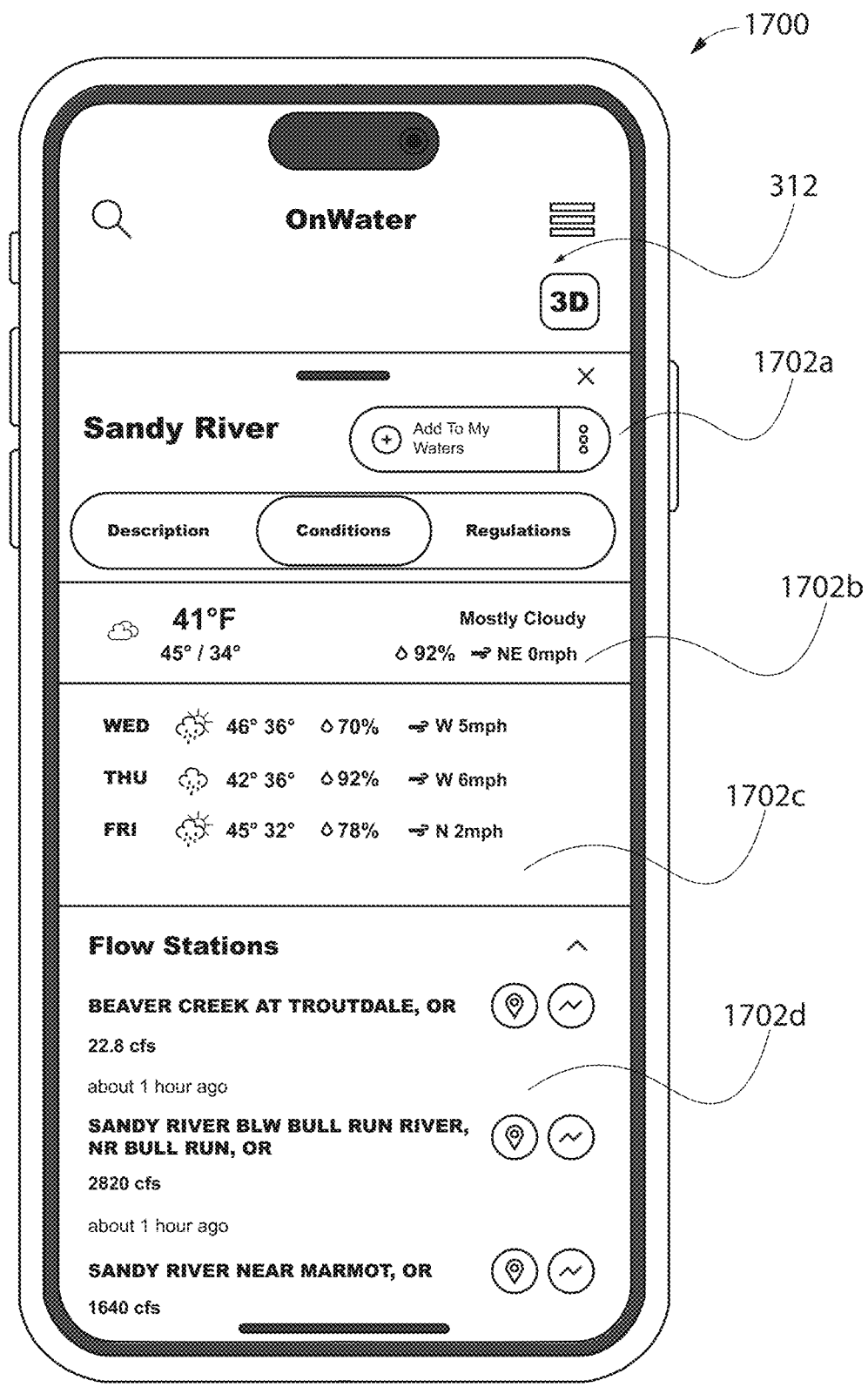
FIG. 17 illustrates a schematic of an image processing device displaying weather characteristics through the user interface of the user device.
Figure 18:
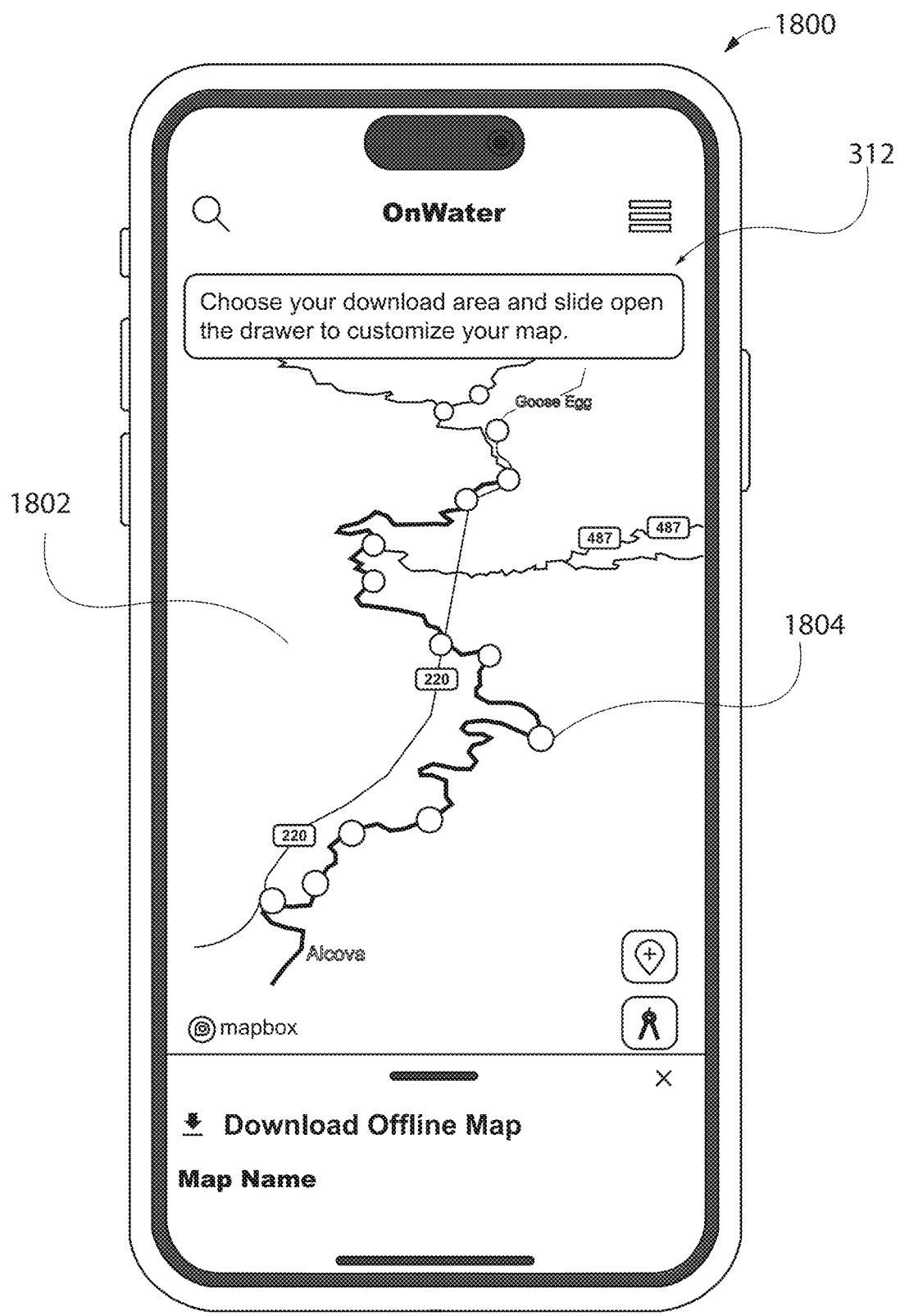
FIG. 18 illustrates a schematic of an image processing device displaying a river-map through the user interface of the user device.
Figure 19:
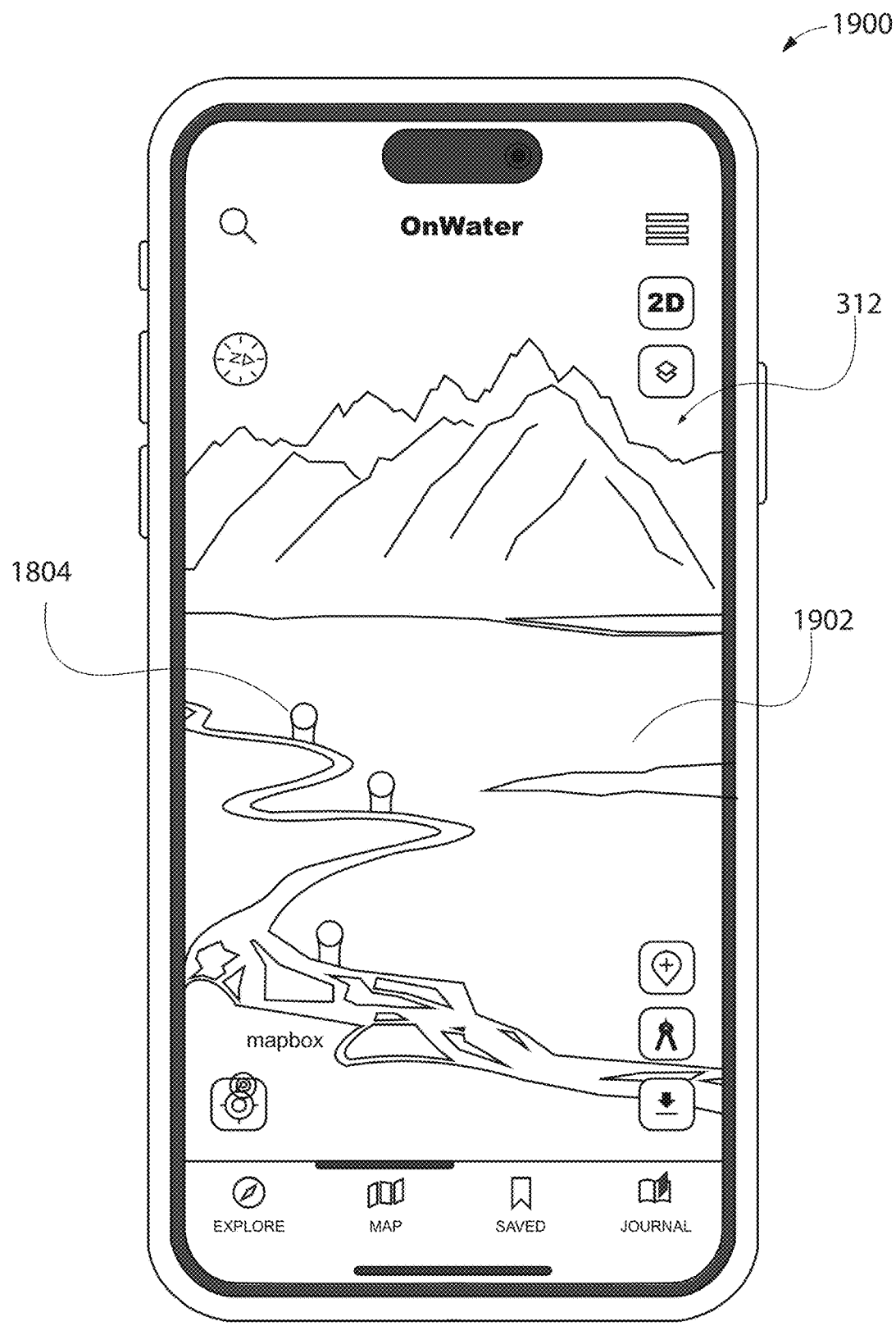
FIG. 19 illustrates a schematic of an image processing device displaying a 3-D map through the user interface of the user device.
Figure 20:
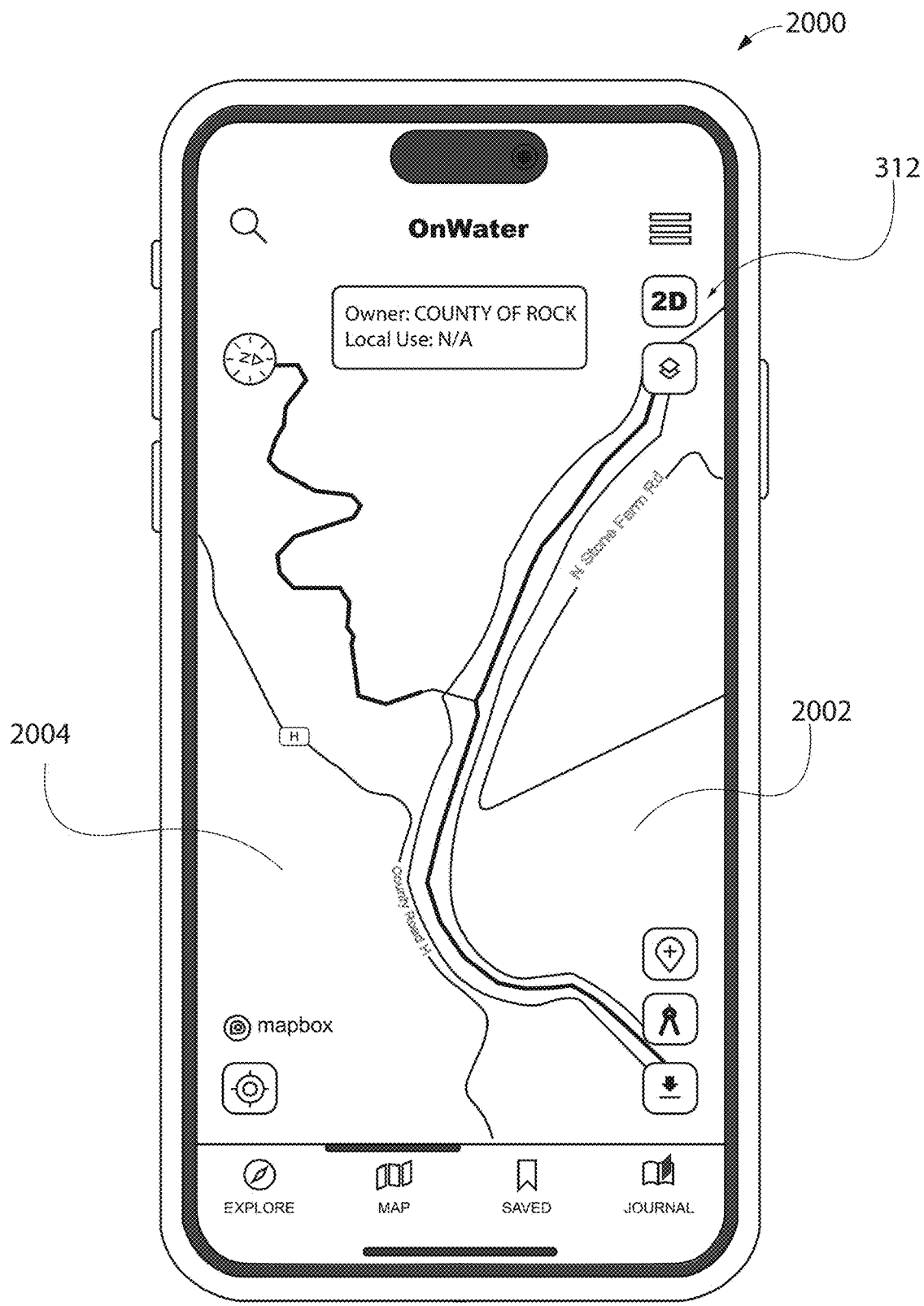
FIG. 20 illustrates a schematic of an image processing device displaying a boundary-based map through the user interface of the user device.
Figure 21:
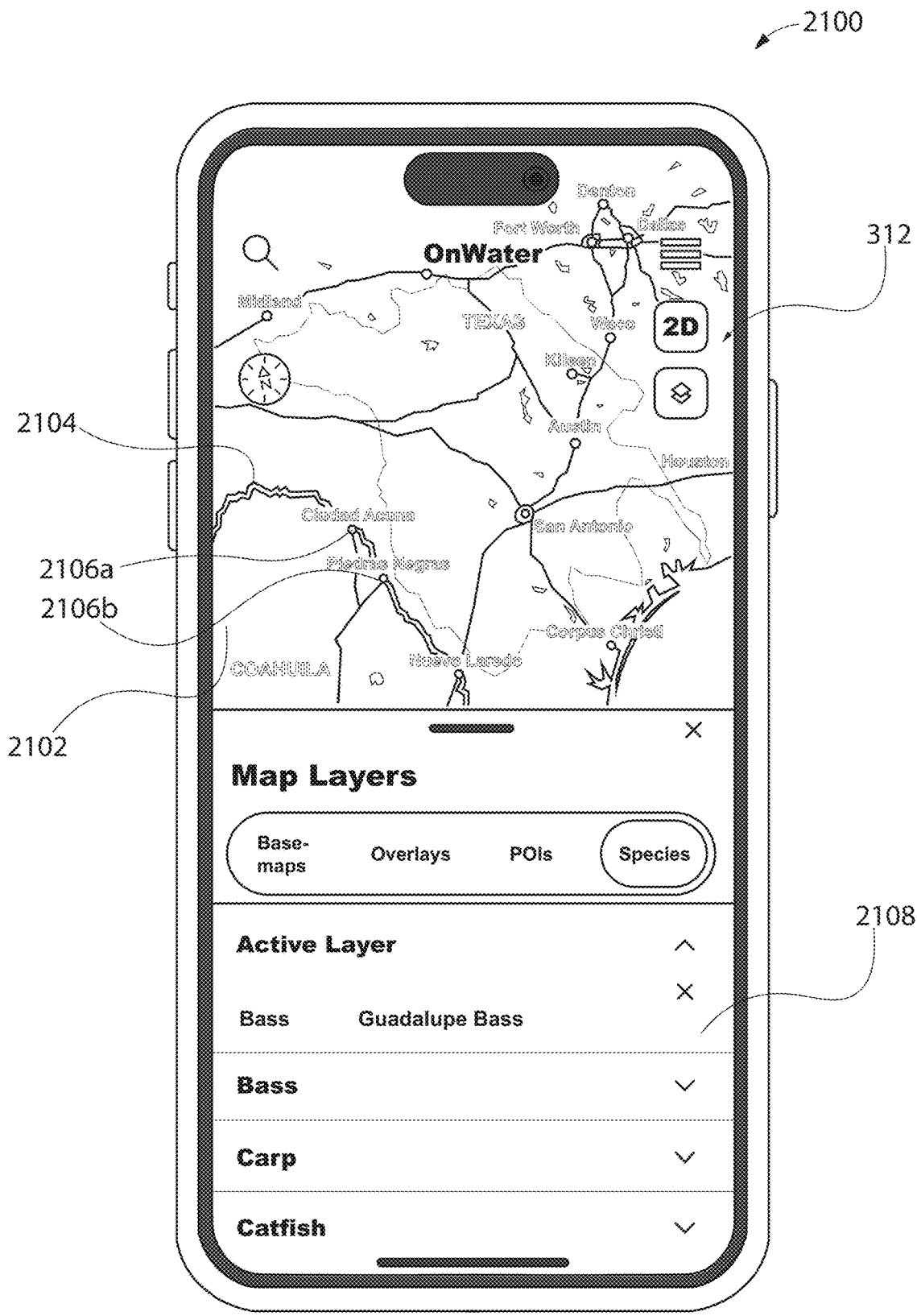
FIG. 21 illustrates a schematic of an image processing device displaying a map spotting species of fishes through the user interface of the user device.

Now, FIG. 15 illustrates a process layout 1500 of the physical characteristic determination process implemented by the image-processing system 302 when embedded as a physical characteristic tool in the user device, FIG. 16 illustrates a schematic 1600 of an image processing device 304 displaying physical characteristics of the fish through user interface 312 of the user device, and FIG. 17 illustrates a schematic 1700 of an image processing device 304 displaying weather characteristics through user interface 312 of the user device. Further, FIG. 18 illustrates a schematic of an image processing device displaying a river map through the user interface of the user device, FIG. 19 illustrates a schematic of an image processing device displaying a 3-D map through the user interface of the user device, FIG. 20 illustrates a schematic of an image processing device displaying a boundary-based map through the user interface of the user device, and FIG. 21 illustrates a schematic of an image processing device displaying a map spotting species of fishes through the user interface of the user device.

In one illustrative configuration, now referring to FIG. 15, the characteristic determination tool 1502 may be implemented in the image processing device 304. Initially, at step 1504, the characteristic determination tool 1502 may be configured to obtain site data related to the site at which the fish is captured. The site data may include geology characteristics and weather characteristics associated with the site. Further, at step 1504, the characteristic determination tool 1502 may be configured to obtain a set of images. The set of images may be stored in the memory of the image processing device 304 or captured in real-time using the image capturing device 310. At step 1508, the set of images may be pre-processed with the various pre-processing techniques, such as contrast enhancement process 502, de-noising process 602, edge-detection process 702, using the contrast-enhancement module 402, the de-noising module 404, and the edge-detection module 406 respectively. As a result, an edge image of the fish may be generated from the set of images. Further, at step 1510, the edge image of the fish may be segmented into various anatomical segments using the segmentation process 802 executed by the segmentation module 408. Further, at step 1512, the characteristic determination tool 1502 may be configured to determine the physical characteristics of the fish by selecting a target anatomical segment from the various anatomical segments and determining the physical characteristics thereof, using the physical characteristic determination method 902 executed by the physical characteristic determination module 410. Further, the physical characteristics determined may include a length estimate of the fish. Accordingly, the characteristic determination tool 1502 at step 1514 may be configured to display the physical characteristics on the user interface 312 of the image processing device 304.

In one illustrative configuration, the set of images may be transmitted to server 320, such as for example, an image database server 1522. Also, the physical characteristics may be transmitted to a server 320, such as a measurement database 1520. In one illustrative configuration, as explained earlier, the physical characteristic determination module 410 may be implemented as a characteristic determination machine learning model (CD-ML-model). The CD-ML model, prior to deployment, may be trained on various sets of data obtained from the weather database, the fisheries database, the physical characteristics obtained from the measurement database 1520, and the set of images obtained from the image database server 1522. Additionally, the CD-ML model may also be trained based on the feedback received by the user, using the HITL approach and with a feedback function 1516 accessible through the user interface 312. Further, after training, the CD-ML model may be rigorously evaluated on various images of fish. Accordingly, based on the testing, the CD-ML model may be optimized to determine accurate physical characteristics.

In one configuration, the characteristic determination tool 1502 may be implemented in the image processing device 304 within an active communication network to determine the physical characteristics of the fish. However, when the set of images is obtained in an area devoid of network communication, the characteristic determination tool 1502 may delay the process until the image processing device 304 reaches a connected environment. Until then, the set of images may be stored on the data storage module 414 of the image processing device 304. Once the network communication may be established, the characteristic determination tool 1502 may be configured to the process according to the process layout illustrated by FIG. 15, and the physical characteristics of the fish may be determined.

In an illustrative configuration, with continued reference to FIGS. 16-21, the physical characteristics, the species, and the weather data may be displayed on the user interface 312. In one configuration, the user interface 312 may include a graphical user interface (GUI) implemented using a graphics module (not shown in figures) embedded in the image-processing device 302. Accordingly, for the given image, the image processing device 304 may be configured to display the physical characteristics as a current size against pre-defined characteristics, such as a maximum size and a minimum size (which may be obtained from the fisheries database/APIs) through the user interface 312. For example, in FIG. 16, the user interface 312 may include at least one region to display an image of the fish, as well as non-image data for the fish. As seen in figure, the user interface 312 may include a first region 1602 which displays image of the fish. Furthermore, the user interface 312 may include one or more regions 1604a, 1604b, 1604c, 1604d, 1604f, and 1604e, which may display non-image data associated with the fish. For example, the region 1604a may display the physical characteristics of the fish such as a current size of the fish displayed in the first region 1602. Further, the regions 1604b and 1604c may display minimum size and maximum size of the fish respectively, and the regions 1604d, 1604f, and 1604e may display edibility, behavior, and a prompt for feedback on the physical characteristics determined by the region 1604a respectively.

In an illustrative configuration, the user interface 312 may also be configured to determine environmental data, and weather data associated to the location at which at least one image of the fish is captured. The user interface 312 may be configured to capture the environmental data from the server 320 (HRRR by NOAA), or any other capturing method which may include, but not limited to capturing environmental data and weather data with analysis of local radio signals, data procured from cellular systems (e.g. phone and/or tower data), and/or manual entry in third party applications. The environmental data and the weather data may include, but not limited to temperature, sky conditions (cloudy, sunny, etc.), wind speed, wave height, wave current speed, stability of wind speed and wave current speed, stability of temperature, precipitation, water condition (sandy, clear, etc.), or presence of non-water matter (silt, debris, plants, etc.), and the like. For example, referring to FIG. 17, a region 1702a within the user interface 312 may be configured to display the water condition of the river, or a water body at which the image may be captured. Further, the region 1702b may display weather, sky data, precipitation, wind speed, and the like. Further, the region 1702c may display weather forecast for successive days from the date of capturing of at least one image. In the same configuration, the region 1702d may also indicate the water level of the water body. The region 1702d may be configured to determine the discharge (in cfs) in a river from a water flow station with an appropriate timestamp. For example, the region 1702d may be configured to display the amount of discharge processed in the water body at a historical time with respect to a current time, or in other words, display the time passed since the last discharge in the water body.

In an illustrative configuration, the user interface 312 may also be configured to provide a customizable map 1802 which may be customized by an end user to highlight and locate at least one area of interest thereon. For example, referring to FIG. 18, the customizable map may include a river map, or a map of a terrain on which the user may be configured to determine at least one region of interest 1804. This at least one region of interest 1804 may include spots on the map, or locations at which on the river favorable for fishing, such as regions where population of the fish is high, or regions at which the current of the river may be optimal for fishing. In one configuration, the customizable map 1802 may be downloaded by the user and stored in the memory 308 of the image processing device. This downloaded map may be accessed offline and revisited by the user whenever desired. Similarly, such customizable map may also be represented as a three dimensional (3-D) map 1902 by the user interface 312 (refer to FIG. 19). The customization of the 3-D map may be similar to the customization of the customizable map 1802.

In an illustrative configuration, the user interface 312 may also be configured to display the type of fishing area, i.e., private land areas or public land areas. For example, the user interface 312 may utilize any of the customizable map 1802 of the 3-D map 1902 to illustrate that which portion of the region may be accessible by public for carrying out the fishing activity, based on local land laws thereby avoiding conflict with landowners. For example, the region 2002 may be a private land and the region 2004 may be a public land. Therefore, the user interface 312 may be configured to demonstrate the region 2004 as accessible, and may also provide a distress signal indicating trespassing if the user accesses the region 2002.

In an illustrative configuration, prior to displaying on the regions 1602 and 1604*a* the user interface 312 may be configured to obtain the physical characteristics of the fish obtained by the CD-ML model implemented by the physical characteristic determination module 410, which may be stored on one of the servers 320. Further, the user interface 312 may also be configured to acquire predefined characteristics (such as minimum size and maximum size) from, but not limited to a Fisheries-Application Programming interface such as Fishbase API, iNaturalist API, and the like. Moreover, for displaying weather characteristics pertaining to a location, the user interface 312 may be configured to obtain weather characteristics from, but not limited to a weather API such as for example, Open WeatherMap, Weatherstack, AccuWeather, and the Weather Company Data API (formerly known as the IBM Weather Company Data API).

In an illustrative configuration, the user interface 312 may also display distribution of species of at least one fish in a predefined map. For example, the region 2102 may indicate a map of a region 2102 which may display a river 2104. Further, the user may access the user interface 312 to gain insights on the species of the fish present populating various parts of the river 2104, For example, at point 2106*a* of the river, if the population of the species bass may be higher, the region 2108 may be configured to determine the presence of fish species "bass" when the point 2106*a* may be prompted by the user. Accordingly, if the region 2106*b* has higher population of species "catfish", the region 2108 may be configured to display the presence of species "catfish" when the point 2106*b* may be prompted by the user. The presence of fishes may be analyzed with the information received from weather APIs and the Fisheries APIs.

Figure 22:
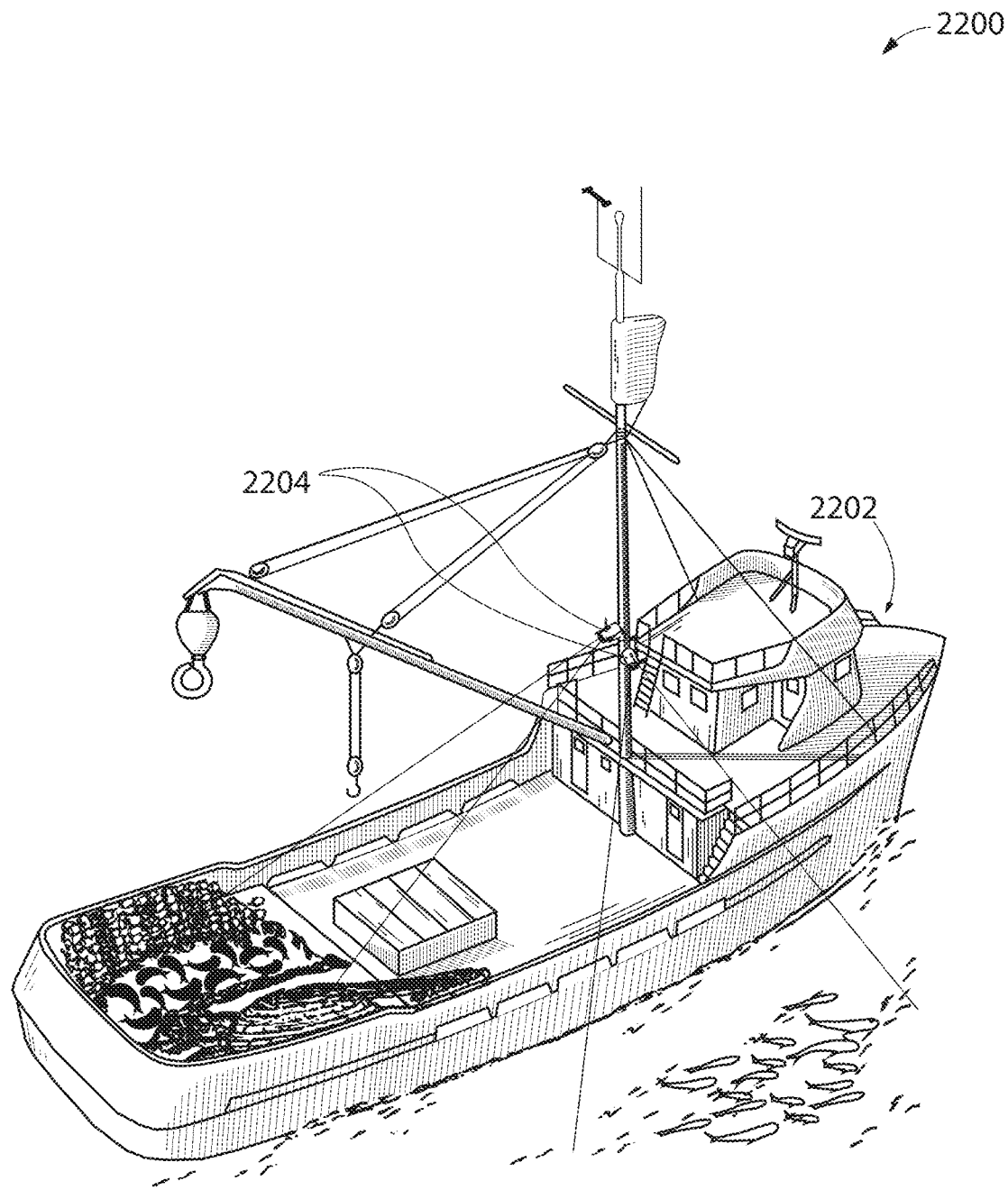
FIG. 22 illustrates a schematic of an ocean vessel.
Figure 23:
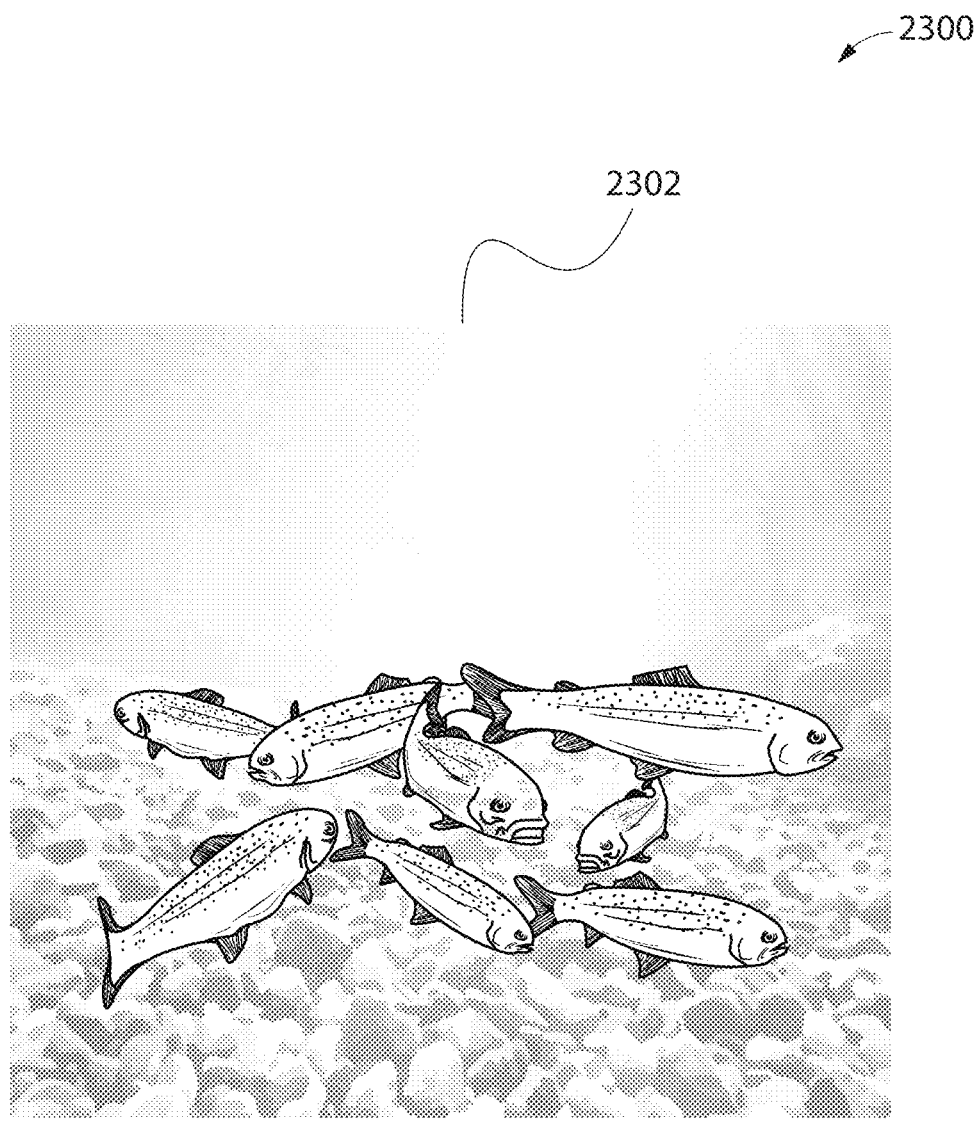
FIG. 23 illustrates a schematic of at least one image captured by the set of image-capturing devices.

In an alternative configuration, FIG. 22 illustrates a schematic 2200 of an ocean vessel 2202, and FIG. 23 illustrates a schematic 2300 of at least one image 2302 captured by the set of image-capturing devices 2204.

While the system and method for determination of the physical characteristics above illustrated are suitable for recreational activities such as fly fishing, and additionally, the physical characteristics are also implementable in the field of deep-sea fishing. For example, the ocean vessel 2202 may include a set of image-capturing devices 2204 installed at an elevated position thereon, or submerged underwater with a connection line communicably coupled to a control panel of the ship. Further, the set of image-capturing devices 2204 may be configured to capture at least one image 2302 of fishes swimming underwater within the ocean. Further, at least one image 2302 may also be processed for determining the physical characteristics of the fish, by implementing the control panel of the ocean vessel as the image processing device 304. The control panel may be configured to determine the physical characteristics of the ocean fish using a process similar to the process enacted by FIG. 15. Particularly, the control panel may be embedded with the characteristic determination tool which may be configured to deploy various methodologies, such as pre-processing of at least one image 2302 captured by the set of image-capturing devices 1804, segment the pre-processed images, and determine physical characteristics of fishes present in at least one image 2302 using the modules 402-414. This is already explained in detail in conjunction with FIG. 15.

Figure 24:
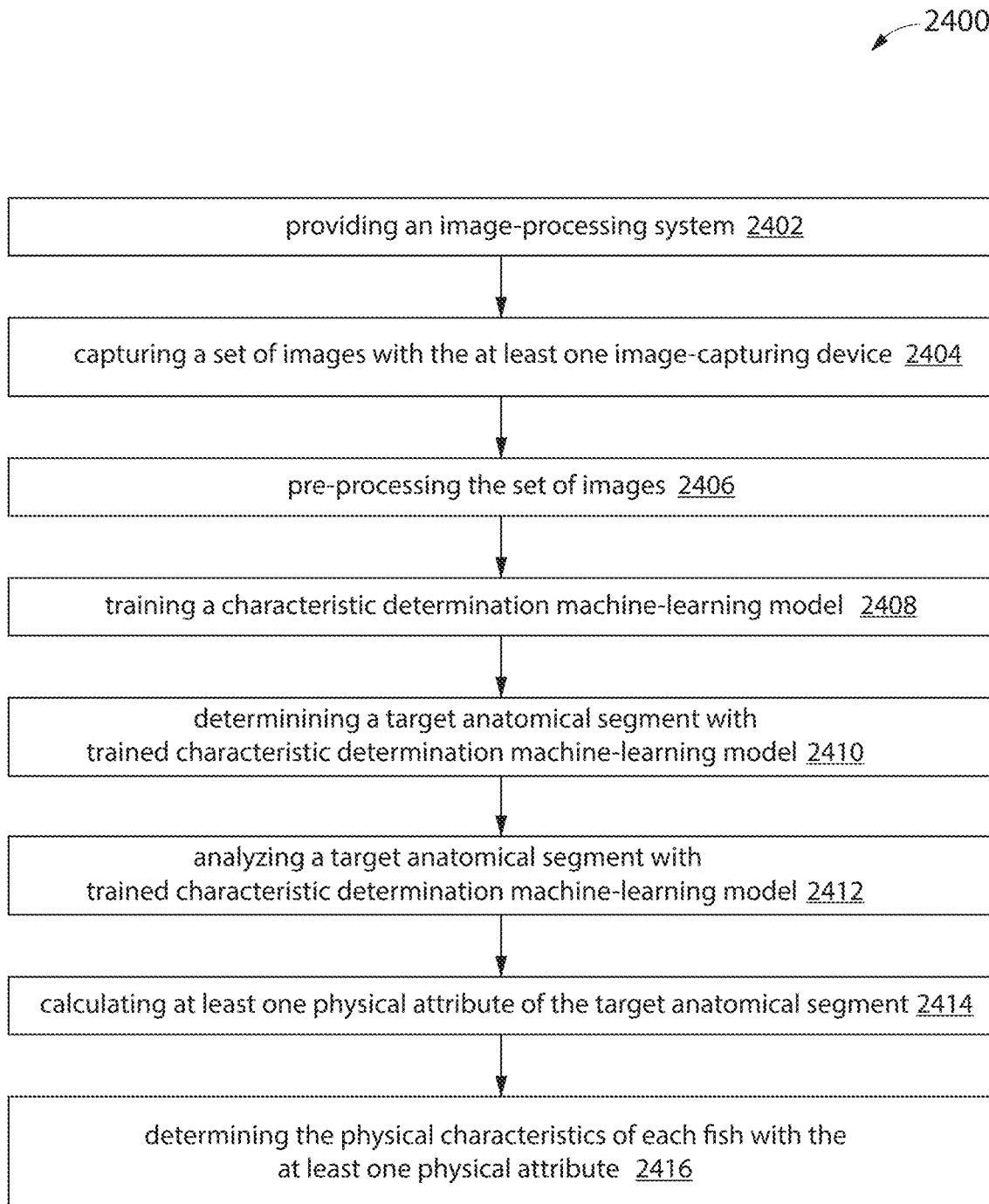
FIG. 24 illustrates a flowchart of a physical characteristic determination method.

Now, FIG. 24 illustrates a flowchart 2400 of a physical characteristic determination method. The physical characteristic determination method may include one or more steps for pre-processing at least one image of a fish, segmenting the pre-processed images, and determining the physical characteristics of the fish present.

Now, at step 2402, an image-processing system 302 may be provided. The image-processing system 302 may be an image-processing device 304. Further, the image processing device 304 may include a processor 306, and a memory 308 communicably coupled to the processor 306. Further, the image-processing system 302 may further include an image-capturing device 310 embedded in the image-processing device 304, or an externally connected to the image-processing device 304.

At step 2404, a set of images of at least one fish from a first site may be captured by the image capturing device 310. The image-capturing device 310 may be embedded in the image-processing device 304, or an externally connected to the image-processing device 304. Further, at step 2406, the set of images of at least one fish may be pre-processed, in which a set of contrast-enhanced images from the set of images may be initially generated by a contrast-enhancement process 502 implemented by a contrast-enhancement module 402. Further, the set of contrast-enhanced images may be de-noised for obtaining a de-noised set of images using a de-noising process 602 implemented by a de-noising module 404. Further, edges associated with at least one fish in the de-noised set of images may be detected with an edge-detection process 702 implemented by an edge-detection module 406, and hence, an edge image relevant to at least one fish may be created. Further, the edge image may be segmented into at least one anatomical segment of at least one fish using a segmentation process 802 implemented by a segmentation module 408.

At step 2408, a characteristic determination machine-learning model may be trained for generating a trained characteristic determination machine-learning model. The characteristic determination machine-learning model may be trained using one or more input data obtained from one or more servers 320, historical measurements of previously captured fishes, and the like. Further, at step 2410, the trained characteristic determination machine-learning model may determine a target anatomical segment from at least one anatomical segment. The trained characteristic determination machine-learning model may be configured to select and prioritize at least one anatomical segment to determine the target anatomical segment based on predefined criteria.

At step 2412, the target anatomical segment may be analyzed with the trained characteristic determination machine-learning model. Further, at step 2014, the trained characteristic determination machine-learning model may be configured to determine at least one physical attribute of the target anatomical segment of at least one fish, and based on at least one physical attribute at step 2416, at least one physical characteristics of at least one fish may be determined. This is already explained in detail in conjunction with FIGS. 5-17.

Figure 25:
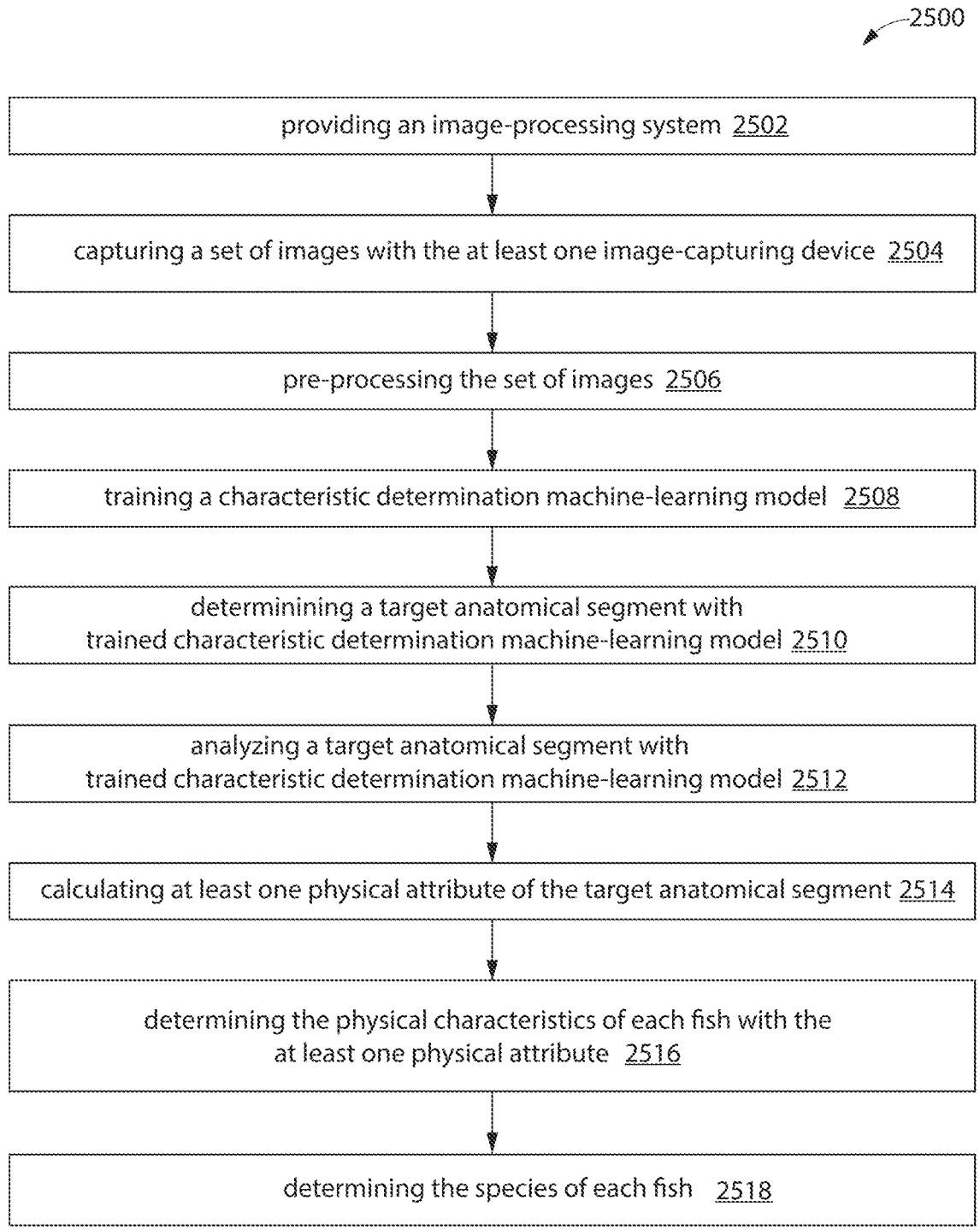
FIG. 25 illustrates a flowchart of a species identification method.

Now, FIG. 25 illustrates a flowchart 2500 of a species identification method. The physical characteristic determination method may include one or more steps for pre-processing at least one image of a fish, segmenting the pre-processed images, determining the physical characteristics of the fish present, and based on the physical characteristics, identifying the species of at least one fish.

Now, at step 2502, an image-processing system 302 may be provided. The image-processing system 302 may be an image-processing device 304. Further, the image-processing device 304 may include a processor 306 and a memory 308 communicably coupled to the processor 306. Further, the image-processing system 302 may further include an image-capturing device 310 embedded in or externally connected to the image-processing device 304.

At step 2504, a set of images of at least one fish from a first site may be captured by the image capturing device 310. The image-capturing device 310 may be embedded in the image-processing device 304 or externally connected to the image-processing device 304. Further, at step 2506, the set of images of at least one fish may be pre-processed, in which a set of contrast-enhanced images from the set of images may be initially generated by a contrast-enhancement process 502 implemented by a contrast-enhancement module 402. Further, the set of contrast-enhanced images may be de-noised to obtain a de-noised set of images using a de-noising process 602 implemented by a de-noising module 404. Further, edges associated with at least one fish in the de-noised set of images may be detected with an edge-detection process 702 implemented by an edge-detection module 406. Hence, an edge image relevant to at least one fish may be created. Further, the edge image may be segmented into at least one anatomical segment of at least one fish using a segmentation process 802 implemented by a segmentation module 408.

At step 2508, a characteristic determination machine-learning model may be trained to generate a trained characteristic determination machine-learning model. The characteristic determination machine-learning model may be trained using one or more input data obtained from one or more servers 320, historical measurements of previously captured fishes, and the like. Further, at step 2510, the trained characteristic determination machine-learning model may determine a target anatomical segment from at least one anatomical segment. The trained characteristic determination machine-learning model may be configured to select and prioritize at least one anatomical segment to determine the target anatomical segment based on predefined criteria.

At step 2512, the target anatomical segment may be analyzed with the trained characteristic determination machine-learning model. Further, at step 2514, the trained characteristic determination machine-learning model may be configured to determine at least one physical attribute of the target anatomical segment of at least one fish, and based on at least one physical attribute, at step 2516, at least one physical characteristics of at least one fish may be determined. Further, at step 2518, based on at least one physical attribute of the target anatomical segment of at least one fish, and based on at least one physical characteristic of at least one fish, species of at least one fish may be identified. This is already explained in detail in conjunction with FIGS. 5-17.

Figure 26:
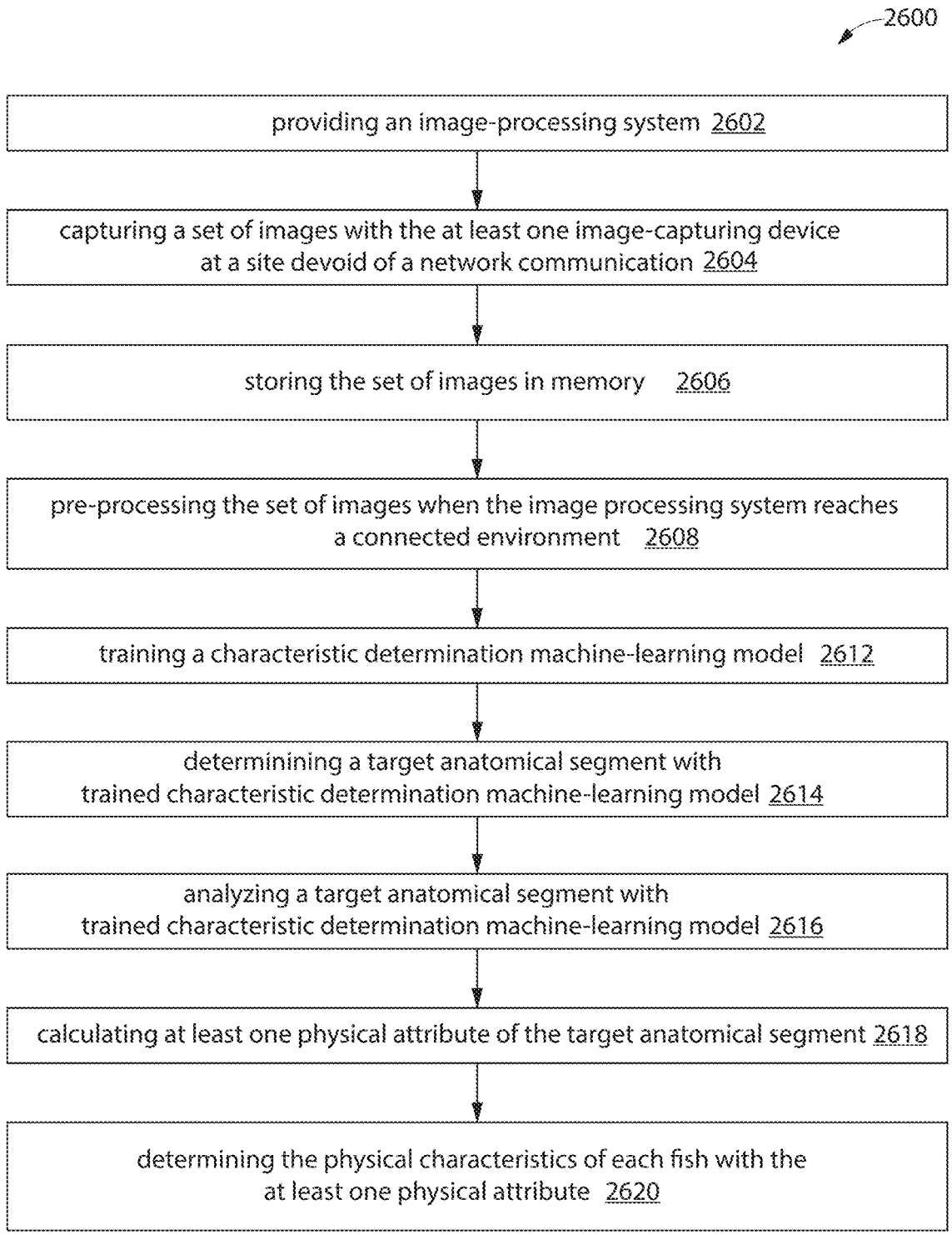
FIG. 26 illustrates a flowchart of a physical characteristic determination method.

Now, FIG. 26 illustrates a flowchart 2600 of a physical characteristic determination method. The physical characteristic determination method may include one or more steps for pre-processing at least one image of a fish at a site devoid of network communication, segmenting the pre-processed images, and determining the physical characteristics of the fish when the network connectivity is present.

Now, at step 2602, an image-processing system 302 may be provided. The image-processing system 302 may be an image-processing device 304. Further, the image-processing device 304 may include a processor 306, and a memory 308 communicably coupled to the processor 306. Further, the image-processing system 302 may further include an image-capturing device 310 embedded in the image processing device 304, or an externally connected to the image-processing device 304.

At step 2604, a set of images of at least one fish from a first site may be captured by the image capturing device 310. The image-capturing device 310 may be embedded in the image-processing device 304 or externally connected to the image-processing device 304. Further, the first site may be devoid of network communication. Further, at step 2606, the set of images of at least one fish may be stored in the memory 308. As the image processing device reaches a connected environment, at step 2608, the set of images may be pre-processed, in which a set of contrast-enhanced images from the set of images may be initially generated by a contrast-enhancement process 502 implemented by a contrast-enhancement module 402. Further, the set of contrast-enhanced images may be de-noised to obtain a de-noised set of images using a de-noising process 602 implemented by a de-noising module 404. Further, edges associated with at least one fish in the de-noised set of images may be detected with an edge-detection process 702 implemented by an edge-detection module 406. Hence, an edge image relevant to at least one fish may be created. Further, the edge image may be segmented into at least one anatomical segment of at least one fish using a segmentation process 802 implemented by a segmentation module 408.

At step 2612, a characteristic determination machine-learning model may be trained to generate a trained characteristic determination machine-learning model. The characteristic determination machine-learning model may be trained using one or more input data obtained from one or more servers 320, historical measurements of previously captured fishes, and the like. Further, at step 2614, the trained characteristic determination machine-learning model may determine a target anatomical segment from at least one anatomical segment. The trained characteristic determination machine-learning model may be configured to select and prioritize at least one anatomical segment to determine the target anatomical segment based on predefined criteria.

At step 2616, the target anatomical segment may be analyzed with the trained characteristic determination machine-learning model. Further, at step 2618, the trained characteristic determination machine-learning model may be configured to determine at least one physical attribute of the target anatomical segment of at least one fish, and based on at least one physical attribute at step 2620, at least one physical characteristics of at least one fish may be determined. This is already explained in detail in conjunction with FIGS. 5-17.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical characteristic vectors (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations, except as limited by the prior art. While the principles of the disclosure have been described above in connection with specific apparatuses and methods, it is to be clearly understood that this description is made only by way of example and not as a limitation on the scope of the disclosure.

What is claimed is:

1. A characteristics-determination method for determining a physical characteristic of at least one fish, the characteristics-determination method comprising:
    providing an image-processing system, comprising:
        at least one image-capturing device;
    capturing with the at least one image-capturing device, a set of images of at least one fish from a first site;
    pre-processing the set of images, the pre-processing comprising:
        generating a set of contrast-enhanced images from the set of images;
        de-noising the set of contrast-enhanced images for obtaining a de-noised set of images;
        detecting edges associated with at least one fish in the de-noised set of images for creating an edge image relevant to at least one fish; and
        segmenting the edge image into at least one anatomical segment of at least one fish;
    training a characteristic determination machine-learning model for generating a trained characteristic determination machine-learning model;
    determining with the trained characteristic determination machine-learning model, a target anatomical segment from the at least one anatomical segment;
    analyzing the target anatomical segment with the trained characteristic determination machine-learning model, the analyzing comprising:
        calculating at least one physical attribute of the target anatomical segment of at least one fish; and
        determining with the trained characteristic determination machine-learning model, at least one physical characteristics of at least one fish with the at least one physical attribute associated therewith.

2. The characteristics-determination method of claim 1, wherein calculating at least one physical attribute further comprises:
    determining a first region of interest within the target anatomical segment;
    calculating at least one dimension of the first region of interest; and
    converting the at least one dimension to at least one physical attribute of the target anatomical segment using a reference scale associated with two-dimensional images.

3. The characteristics-determination method of claim 2, wherein converting the at least one dimension to at least one physical attribute comprises:
    the at least one physical attribute comprising:
        physical dimensions of the at least one anatomical segment.

4. The characteristics-determination method of claim 3 and further comprising:
    displaying the at least one physical characteristics of at least one fish to a user with a user interface of the image-processing system;
    receiving at least one feedback from the user on the at least one physical characteristics of at least one fish;
    refining the trained characteristic determination machine-learning model with the at least one feedback for creating a refined characteristic determination machine-learning model; and
    refining the at least one physical characteristics of at least one fish with the refined characteristic determination machine-learning model.

5. The characteristics-determination method of claim 2, wherein determining the at least one physical characteristics of at least one fish comprises:
- determining a second region of interest of at least one fish;
- calculating at least one dimension of the first region of interest;
- determining a dimension ratio of the at least one dimension of the first region of interest and the at least one dimension of the second region of interest; and
- analyzing the at least one physical attribute of the target anatomical segment with dimension ratio for determining the at least one physical characteristics of at least one fish.

6. The characteristics-determination method of claim 5, wherein displaying the at least one physical characteristics further comprises:
- the at least one physical characteristics of the at least one fish comprising at least one of:
  - a length;
  - a height; and
  - a volume.

7. The characteristics-determination method of claim 5, determining the target anatomical segment from the at least one anatomical segment further comprises:
- determining the target anatomical segment from the at least one anatomical segment with a predefined criteria.

8. The characteristics-determination method of claim 1 and further comprising:
- transmitting the at least one physical characteristics to a first server.

9. The characteristics-determination method of claim 1 and further comprising:
- obtaining weather and geological characteristics associated with the first site from a second server; and
- displaying the weather and geological characteristics associated with the first site, along with the at least one physical characteristics of at least one fish on a user interface.

10. The characteristics-determination method of claim 9, wherein the second server is High Resolution Rapid Refresh (HRRR) maintained by National Oceanic and Atmospheric Administration (NOAA).

11. A characteristics-determination system to determine physical characteristics of at least one fish, the characteristics-determination system comprising:
- an image-processing system, comprising:
  - at least one image-capturing device to capture a set of images of at least one fish from a first site;
  - a processor communicably coupled to the at least one image-capturing device; and
  - a memory communicably coupled to the processor, wherein the memory stores a set of processor-executable instructions which when executed by the processor causes the processor to:
    - generate a set of contrast-enhanced images from the set of images;
    - de-noise the set of contrast-enhanced images for obtaining a de-noised set of images;
    - detect edges associated with at least one fish in the de-noised set of images for creating an edge image relevant to at least one fish;
    - segment the edge image into at least one anatomical segment of at least one fish;
    - train a characteristic determination machine-learning model for generating a trained characteristic determination machine-learning model;
    - determine with the trained characteristic determination machine-learning model, a target anatomical segment from the at least one anatomical segment;
    - analyze the target anatomical segment with the trained characteristic determination machine-learning model to:
      - calculate at least one physical attribute of the target anatomical segment of at least one fish; and
      - determine with the trained characteristic determination machine-learning model, at least one physical characteristics of at least one fish with the at least one physical attribute associated therewith.

12. The characteristics-determination system of claim 11, wherein to calculate at least one physical attribute, the set of processor-executable instructions further causes the processor to:
- determine a first region of interest within the target anatomical segment;
- calculate at least one dimension of the first region of interest; and
- convert the at least one dimension to at least one physical attribute of the target anatomical segment with a reference scale associated with two-dimensional images.

13. The characteristics-determination system of claim 12, wherein the at least one physical attribute comprises:
- physical dimensions of the at least one anatomical segment.

14. The characteristics-determination system of claim 12, wherein to determine characteristics of at least one fish, the set of processor-executable instructions further causes the processor to:
- determine a second region of interest of at least one fish;
- calculate at least one dimension of the first region of interest;
- determine a dimension ratio of the at least one dimension of the first region of interest and the at least one dimension of the second region of interest; and
- analyze the at least one physical attribute of the target anatomical segment with dimension ratio to determine the at least one physical characteristics of at least one fish.

15. The characteristics-determination system of claim 11, wherein the set of processor-executable instructions further causes the processor to:
- display the at least one physical characteristics of at least one fish to a user with a user interface of the image-processing system;
- receive at least one feedback from the user on the at least one physical characteristics of at least one fish;
- refine the trained characteristic determination machine-learning model for creating a refined characteristic determination machine-learning model; and
- refine the at least one physical characteristics of at least one fish with the refined characteristic determination machine-learning model.

16. The characteristics-determination system of claim 15, wherein the at least one physical characteristics of the at least one fish comprises at least one of:
- a length;
- a height; and
- a volume.

17. The characteristics-determination system of claim 11, wherein the set of processor-executable instructions further causes the processor to:
- transmit the at least one physical characteristics to a first server.

18. The characteristics-determination system of claim 11, wherein the target anatomical segment is determined from the at least one anatomical segment with a predefined criteria.

19. The characteristics-determination system of claim 11, wherein the set of processor-executable instructions further causes the processor to:
   obtain weather characteristics and geological characteristics associated with the first site from a second server; and
   display the weather characteristics and geological characteristics associated with the first site, along with the at least one physical characteristics of at least one fish on a user interface.

20. The characteristics-determination system of claim 19, wherein the second server is High Resolution Rapid Refresh (HRRR) maintained by the National Oceanic and Atmospheric Administration (NOAA).

\* \* \* \* \*